United States Patent
Hasegawa et al.

(10) Patent No.: US 8,108,089 B2
(45) Date of Patent: Jan. 31, 2012

(54) VEHICLE AND CONTROL METHOD THEREOF

(75) Inventors: Keiko Hasegawa, Toyota (JP); Toshio Inoue, Gotenba (JP); Daigo Ando, Nisshin (JP); Mamoru Tomatsuri, Toyota (JP); Keita Fukui, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 873 days.

(21) Appl. No.: 12/087,584

(22) PCT Filed: Dec. 20, 2006

(86) PCT No.: PCT/JP2006/325331
§ 371 (c)(1),
(2), (4) Date: Jul. 10, 2008

(87) PCT Pub. No.: WO2007/086213
PCT Pub. Date: Aug. 2, 2007

(65) Prior Publication Data
US 2009/0005924 A1 Jan. 1, 2009

(30) Foreign Application Priority Data
Jan. 27, 2006 (JP) ................................ 2006-019030

(51) Int. Cl.
*F02D 45/00* (2006.01)
(52) U.S. Cl. ................ 701/22; 290/17; 290/21; 290/34; 477/167
(58) Field of Classification Search .................... 701/22, 701/57; 290/1 A, 17, 21, 34; 477/167; 123/328, 123/339.1; *F02D 45/00*
See application file for complete search history.

(56) References Cited

U.S. PATENT DOCUMENTS

| | | | | |
|---|---|---|---|---|
| 5,393,275 A * | 2/1995 | Okada et al. | .................... | 477/81 |
| 5,588,937 A * | 12/1996 | Kono et al. | .................... | 477/169 |
| 5,665,020 A * | 9/1997 | Kamada et al. | ............... | 475/129 |
| 6,077,186 A * | 6/2000 | Kojima et al. | .................... | 477/3 |
| 6,702,716 B2 * | 3/2004 | Yamaguchi et al. | .......... | 477/180 |
| 6,758,788 B2 * | 7/2004 | Itou | .................... | 477/8 |
| 2001/0044361 A1 * | 11/2001 | Taniguchi et al. | ............ | 477/111 |
| 2003/0045988 A1 * | 3/2003 | Suzuki et al. | .................... | 701/54 |
| 2003/0203790 A1 * | 10/2003 | Matsubara et al. | ........... | 477/107 |
| 2004/0084002 A1 * | 5/2004 | Mitsutani et al. | .......... | 123/179.4 |
| 2004/0148071 A1 | 7/2004 | Itoh et al. | | |
| 2004/0235613 A1 * | 11/2004 | Aoki et al. | ........................ | 477/3 |
| 2006/0166789 A1 * | 7/2006 | Katou et al. | .................. | 477/167 |

FOREIGN PATENT DOCUMENTS

| | | |
|---|---|---|
| EP | 0 908 619 A1 | 4/1999 |
| EP | 1 153 786 A1 | 11/2001 |
| EP | 1 577 141 A2 | 9/2005 |
| JP | A-11-107834 | 4/1999 |
| JP | A-2001-295683 | 10/2001 |
| JP | A-2002-325309 | 11/2002 |
| JP | A-2004-204957 | 7/2004 |
| JP | A-2004-229373 | 8/2004 |
| JP | A-2005-151645 | 6/2005 |
| JP | A-2005-170317 | 6/2005 |
| JP | 2005325794 A * | 11/2005 |
| JP | 2005337170 A * | 12/2005 |

* cited by examiner

*Primary Examiner* — Tuan C. To
(74) *Attorney, Agent, or Firm* — Oliff & Berridge, PLC

(57) ABSTRACT

When the engine being in an idling operation and it is in a running state (S410, S420), a value 1 is set to a learning-determination flag F1 (step S460) and the learning of the idling control value is performed when the transmission is in the state of Lo gear and it is not immediately after a Hi-Lo shifting has been performed (S430 to S450).

14 Claims, 9 Drawing Sheets

US 8,108,089 B2

VEHICLE AND CONTROL METHOD THEREOF

TECHNICAL FIELD

The present invention relates to a vehicle and a control method thereof.

BACKGROUND ART

Conventionally, as this type of vehicle, there has been proposed one having an engine and a motor which can output power to the axle side, in which when a learning condition to learn a control value used in controlling the idling operation of the engine is satisfied, deactivation of the engine is prohibited until the learning is completed (see, for example, Patent Document 1). In this vehicle, the deactivation of the engine is prohibited until the learning of the control value is completed to make the learning appropriate in a hybrid vehicle which has less opportunity for learning the control value thereby improving the idling operation.

[Patent document 1] Japanese Patent Laid-open Gazette No. H11-107834

DISCLOSURE OF THE INVENTION

On the other hand, in a vehicle having an engine which can output power to the axle side and a motor which can output power to the axle side via a transmission, it is desirable to ensure opportunity to learn the control value as well as to make the learning more appropriate in consideration of the variation of the control value due to the condition of the transmission.

One of the objects of the vehicle and control method thereof of the present invention is, in a vehicle having an internal combustion engine which can output power to the axle side and a motor which can output power to the axle side via a transmission, to make the learning of an idling control value, which is a control value of the idling operation of the internal combustion engine, more appropriate. Also, another object of the vehicle and control method thereof of the present invention is to suppress the variation of the learning value of the idling control value in a vehicle having an internal combustion engine which can output power to the axle side and a motor which can output power to the axle side via a transmission. Furthermore, another object of the vehicle and control method thereof of the present invention is to ensure opportunity to learn the idling control value in a vehicle having an internal combustion engine which can output power to the axle side and a motor which can output power to the axle side via a transmission.

To achieve at least part of the above described objects, the vehicle and control method thereof of the present invention have adopted the following manner.

The present invention is directed to a vehicle. The vehicle includes: an internal combustion engine which can output power to an axle side; an electric motor which can input and output power; a transmission unit connected to a rotating shaft of the electric motor and the axle side, the transmission unit transmitting power between the rotating shaft and the axle side accompanied by a change of shift range; a driving-force demand setting module which sets a driving force demand required for the axle; a learning-determination module which determines whether or not to learn an idling control value, which is a control value of idling operation of the internal combustion engine, based on a predetermined learning condition including a condition that the internal combustion engine is in an idling operation and a condition that the shift range of the transmission unit is a predetermined shift range; a learning-execution module which executes the learning of the idling control value based on the determination result by the learning-determination module; and a control unit which, when it is determined not to learn the idling control value by the learning-determination module, controls the internal combustion engine, the electric motor, and the transmission unit such that driving force based on the set driving force demand is output to the axle accompanied by an intermittent operation of the internal combustion engine and a change of shift range of the transmission unit, and when it is determined to learn the idling control value by the learning-determination module, controls the internal combustion engine, the electric motor, and the transmission unit such that driving force based on the set driving force demand is output to the axle accompanied by a continuation of the idling operation of the internal combustion engine within a range in which the idling operation of the internal combustion engine is permitted based on a running condition of the vehicle.

In the vehicle of the present invention, it is determined whether or not to learn an idling control value, which is a control value of an idling operation of an internal combustion engine, based on a predetermined learning condition including a condition that the internal combustion engine is in an idling operation and a condition that the shift range of the transmission unit, which is connected to the rotating shaft of the electric motor and the axle side, and transmits power between the rotating shaft and the axle side accompanied by a change of the shift range, is a predetermined shift range; and learning of the idling control value is executed based on the determination result. When it is determined not to learn the idling control value, the internal combustion engine, the electric motor and the transmission unit are controlled such that a driving force based on the driving force demand which is required for the axle is output to the axle accompanied by an intermittent operation of the internal combustion engine and a change of the shift range of the transmission unit, and when it is determined to learn the idling control value, the internal combustion engine, the electric motor, and the transmission unit are controlled such that a driving force due to the driving force demand which is required for the axle is output to the axle accompanied by the continuation of the idling operation of the internal combustion engine within a range in which the idling operation of the internal combustion engine is permitted based on the running condition of the vehicle. Therefore, compared with a case in which regardless of whether or not the shift range of the transmission unit is the predetermined shift range, the learning of idling control value is performed, it is possible to suppress the variation of the learning value based on the shift range of the transmission unit thereby making the learning of idling control value more appropriate. Of course, when it is determined not to learn the idling control value, it is possible to increase the energy efficiency by intermittently operating the internal combustion engine.

In such vehicle of the present invention, the aforementioned learning-determination module may also be a module which, even when the condition that the internal combustion engine is in an idling operation and the condition that the shift range of the transmission unit is a predetermined shift range are both satisfied, determines whether or not to learn the aforementioned idling control value supposing that the aforementioned learning condition is not satisfied when the condition that a predetermined time has not elapsed since the shift range of the transmission unit being changed to the predetermined shift range is satisfied. By doing so, although the rotation speed of the rotating shaft of the electric motor has not been stabilized immediately after the shift range of the transmission unit has been changed to the predetermined shift range and this variation of the rotation speed may be transmitted to the output shaft of the internal combustion engine thereby affecting the idling operation of the internal combustion engine, it is possible to suppress the variation of learning value due to the fact that the learning of idling control value is performed before a predetermined time has elapsed since the shift range of the transmission unit being changed to the predetermined shift range. In this case, the learning-determination module may also be a module for determining whether or not to learn the aforementioned idling control value based on the aforementioned predetermined learning condition, regardless of whether or not the condition that a predetermined time has not elapsed since the shift range of the transmission unit being changed to the predetermined shift range has been satisfied when the condition that the vehicle is at a standstill is satisfied. When the vehicle is at a standstill, the axle is not rotating and therefore it is considered that the variation of learning value is small even before a predetermined time has elapsed since the shift range of the transmission unit being changed to the predetermined shift range. Therefore, by determining whether or not to learn the idling control value based on the predetermined learning condition, regardless of whether or not the condition that a predetermined time has not elapsed since the shift range of the transmission unit being changed to the predetermined shift range is satisfied, it is possible to ensure the opportunity to learn the idling control value.

Further, in the vehicle of the present invention, the aforementioned learning-determination module may also be a module for determining whether or not to learn the idling control value based on the predetermined learning condition when the condition that the vehicle is at a standstill is satisfied regardless of whether or not the shift range of the transmission unit is the predetermined shift range. When the vehicle is at a standstill, the axle is not rotating, and therefore it is considered that the variation of the learning value due to the shift range of the transmission unit is small. Therefore, by determining whether or not to learn the idling control value based on the predetermined learning condition, regardless of whether or not the condition that the shift range of the transmission unit is the predetermined sift range is satisfied, it is possible to ensure the opportunity to learn the idling control value.

Further, the vehicle of the present invention may include an operation-continuation instruction module, when the shift range of the transmission unit is not the predetermined shift range, the operation-continuation instruction module determines whether or not it is in a shift-predicted state in which the shift range of the transmission unit is predicted to be changed to the predetermined shift range within a second predetermined time based on the running state of the vehicle and instructs the continuation of the operation of the internal combustion engine when it is determined to be in the shift-predicted state, and the aforementioned control module may be a module for performing control such that the operation of the internal combustion engine is continued when the continuation of the operation of the internal combustion engine is instructed by the aforementioned operation-continuation instruction module. In this way, when it is determined to be in the shift-predicted state, it is possible to prepare for the case in which it is determined to learn the idling control value after the shift range of the transmission unit is changed to the predetermined shift range, and to more reliably ensure the opportunity to learn the idling control value. In this case, by providing a navigation apparatus which outputs a traveling route to the destination instructed by the operator, the operation-continuation instruction module may be a module for determining whether or not it is in the aforementioned shift-predicted state based on at least one of the vehicle speed, the vehicle-speed change amount which is the change amount of the vehicle speed, and the output traveling route. This will make it possible to determine more properly whether or not it is in the shift-predicted state.

In the vehicle of the present invention, the vehicle may also include a vehicle-speed detection module which detects the vehicle speed; the aforementioned transmission unit may be a unit which can change the predetermined shift range with a speedup-side shift range which is a shift range on the speedup side of the predetermined shift range with respect to the vehicle speed; the vehicle may include a shift-instruction module which instructs an upshift of the shift range of the transmission unit such that the shift range of the transmission unit is changed from the predetermined shift range to the aforementioned speedup-side shift range as the detected vehicle speed increases exceeding a first vehicle speed, as well as instructs a downshift of the shift range of the transmission unit such that the shift range of the transmission unit is changed from the aforementioned speedup-side shift range to the predetermined shift range as the detected vehicle speed decreases exceeding a second vehicle speed which is not larger than the first vehicle speed when the learning of idling control value by the learning-execution module has been finished; and instructs an upshift of the shift range of the transmission unit as the detected vehicle speed increases exceeding a third vehicle speed which is larger than the first vehicle speed as well as instructs a downshift of the shift range of the transmission unit as the detected vehicle speed decreases exceeding a forth vehicle speed which is larger than the second vehicle speed and not larger than the third vehicle speed when the learning of idling control value by the learning-execution module has not been finished; and the aforementioned control module may be a module which can perform control such that the shift range of the transmission unit is changed based on the instruction by the shift-instruction module. In this way, when the learning of idling control value has not been completed, the vehicle speed range in which the shift range of the transmission unit is the predetermined shift range becomes larger compared with the case in which the learning of idling control value has been completed, and thus the vehicle speed range in which the predetermined learning condition can be satisfied becomes larger thereby making it possible to more reliably ensure opportunity to learn the idling control value.

Further, the vehicle of the present invention may include an electric power-mechanical power input output mechanism which is connected to an output shaft of the internal combustion engine and the axle side, and inputs and outputs power into and from the output shaft and the drive shaft accompanied by an input and output of electric power and mechanical power. In this case, the electric power-mechanical power input output mechanism may be a mechanism which includes: a three shaft-type power input output module which is connected to three shafts, the output shaft of the internal combustion engine, the axle, and the rotating shaft and inputs or outputs power into or from any one of the three shafts based on the power input or output into or from the remaining two of the three shafts; and an electric motor which can input or output power into or from the rotating shaft.

The present invention is directed to a control method of a vehicle. The vehicle includes an internal combustion engine which can output power to an axle side, an electric motor which can input and output power, and a transmission unit which is connected to a rotating shaft of the electric motor, and the axle side, and transmits power between the rotating shaft and the axle side accompanied by a change of a shift range. The control method of a vehicle includes: (a) determining whether or not to learn an idling control value which is a control value of the idling operation of the internal combustion engine based on a predetermined learning condition including a condition that the internal combustion engine is in an idling operation and a condition that the shift range of the transmission unit is a predetermined shift range; and (b) when it is determined not to learn the idling control value, controlling the internal combustion engine, the electric motor, and the transmission unit such that driving force based on a driving force demand required for the axle is output to the axle accompanied by an intermittent operation of the internal combustion engine and a change of shift range of the transmission unit; and when it is determined to learn the idling control value, controlling the internal combustion engine, the electric motor, and the transmission unit such that a driving force demand required for the axle is output to the axle accompanied by the continuation of the idling operation of the internal combustion engine within a range in which an idling operation of the internal combustion engine is permitted based on the running condition of the vehicle as well as executing the learning of the idling control value.

According to the control method of a vehicle of the present invention, it is determined whether or not to learn the idling control value, which is a control value of the idling operation of the internal combustion engine, based on the predetermined learning condition including a condition that the internal combustion engine is in an idling operation and a condition that the shift range of the transmission unit, which is connected to the rotating shaft of the electric motor and the axle side and transmits power between the rotating shaft and the axle side accompanied by a change of the shift range, is a predetermined shift range, and the learning of the idling control is executed based on the determination result. When it is determined not to learn the idling control value, the internal combustion engine, the electric motor, and the transmission unit are controlled such that a driving force based on the driving force demand which is required for the axle is output to the axle accompanied by an intermittent operation of the internal combustion engine and a change of the shift range of the transmission unit, and when it is determined to learn the idling control value, the internal combustion engine, the electric motor, and the transmission unit are controlled such that a driving force based on the driving force demand which is required for the axle is output to the axle accompanied by a continuation of the idling operation of the internal combustion engine within the range in which the idling operation of the internal combustion engine is permitted based on the running condition of the vehicle. Therefore, compared with a case in which the learning of idling control value is performed regardless of whether or not the shift range of the transmission unit is the predetermined shift range, it is possible to suppress the variation of the learning value due to the shift range of the transmission unit, thereby making the learning of idling control value more appropriate. Of course, when it is determined not to learn the idling control value, it is possible to improve the energy efficiency by intermittently operating the internal combustion engine.

In such control method of a vehicle of the present invention, the step (a) may also be a step of determining whether or not to learn the idling control value supposing that the predetermined learning condition is not satisfied when the condition that a predetermined time has not elapsed since the shift range of the transmission unit being changed to the predetermined shift range, even when both the condition that the internal combustion engine is in an idling operation, and the condition that the shift range of the transmission unit is the predetermined shift range are satisfied. By doing so, although the rotation speeds including the rotation speed of the rotating shaft of the electric motor have not been stabilized immediately after the shift range of the transmission unit has been changed to the predetermined shift range, and these variations of the rotation speeds may be transmitted to the output shaft of the internal combustion engine thereby affecting the idling operation of the internal combustion engine, it is possible to suppress the variation of learning value due to the fact that the learning of idling control value is performed before a predetermined time has elapsed since the shift range of the transmission unit being changed to the predetermined shift range.

Further, in the control method of a vehicle of the present invention, the aforementioned step (a) may be a step of determining whether or not to learn the idling control value based on the predetermined learning condition regardless of whether or not the condition that the shift range of the transmission unit is the predetermined shift range is satisfied when the condition that the vehicle is at a standstill is satisfied. When the vehicle is at a standstill, it is considered that the variation of the learning value due to the shift range of the transmission unit is small since the axle is not rotating. Therefore, it is possible to ensure opportunity to learn the idling control value by determining whether or not to learn the idling control value based on the predetermined learning condition regardless of whether or not the condition that the shift range of the transmission unit is the predetermined shift range is satisfied.

Further, in the control method of a vehicle of the present invention, before the aforementioned step (b), there may be provided a step (c), when the shift range of the transmission unit is not the predetermined shift range, the step (c) determines whether or not it is in a shift-predicted state in which the shift range of the transmission unit is predicted to be changed to the predetermined shift range within a second predetermined time based on the running state of the vehicle and instructs the continuation of the operation of the internal combustion engine when it is determined to be in the shift-predicted state; and the aforementioned step (b) may be a step of performing control such that the operation of the internal combustion engine is continued when the continuation of the operation of the internal combustion engine is instructed by the step (c). In this way, when it is determined to be in the shift-predicted sate, it is possible to prepare for the case in which it is determined to learn the idling control value after the shift range of the transmission is changed to the predetermined shift range, thereby ensuring the opportunity to learn the idling control value.

Alternatively, in the control method of a vehicle of the present invention, the transmission unit may be a unit which can change the predetermined shift range with a speedup-side shift range which is a shift range on the speedup side of the predetermined shift range with respect to the vehicle speed; there may be provided a step (d) in which when the learning of idling control value through the step (b) has been completed, an upshift of the shift range of the transmission unit is instructed so that the shift range of the transmission unit is changed from the predetermined shift range to the aforementioned speedup-side shift range as the vehicle speed increases exceeding a first vehicle speed, as well as a downshift of the shift range of the transmission unit is instructed so that the shift range of the transmission unit is changed from the aforementioned speedup-side shift range to the predetermined shift range as the vehicle speed decreases exceeding a second vehicle speed which is not larger than the first vehicle speed; and when the learning of idling control value through the step (b) has not been completed, an upshift of the shift range of the transmission unit is instructed as the vehicle speed increases exceeding a third vehicle speed which is larger than the first vehicle speed, as well as a downshift of the shift range of the transmission unit is instructed as the vehicle speed decreases exceeding a forth vehicle speed which is larger than the second vehicle speed and not larger than the third vehicle speed; and the aforementioned step (b) may be a step of performing control such that the shift range of the transmission unit is changed based on the instruction through the step (d). In this way, when the learning of idling control value has not been completed, the vehicle speed range, in which the shift range of the transmission unit is the predetermined shift range, becomes larger compared with the case in which the learning of idling control value has been completed, and thus the vehicle speed range in which the predetermined learning condition can be satisfied becomes larger thereby making it possible to more reliably ensure opportunity to learn the idling control value.

BEST MODE FOR CARRYING OUT THE INVENTION

One mode of carrying out the invention is discussed below as a preferred embodiment.

Figure 1:
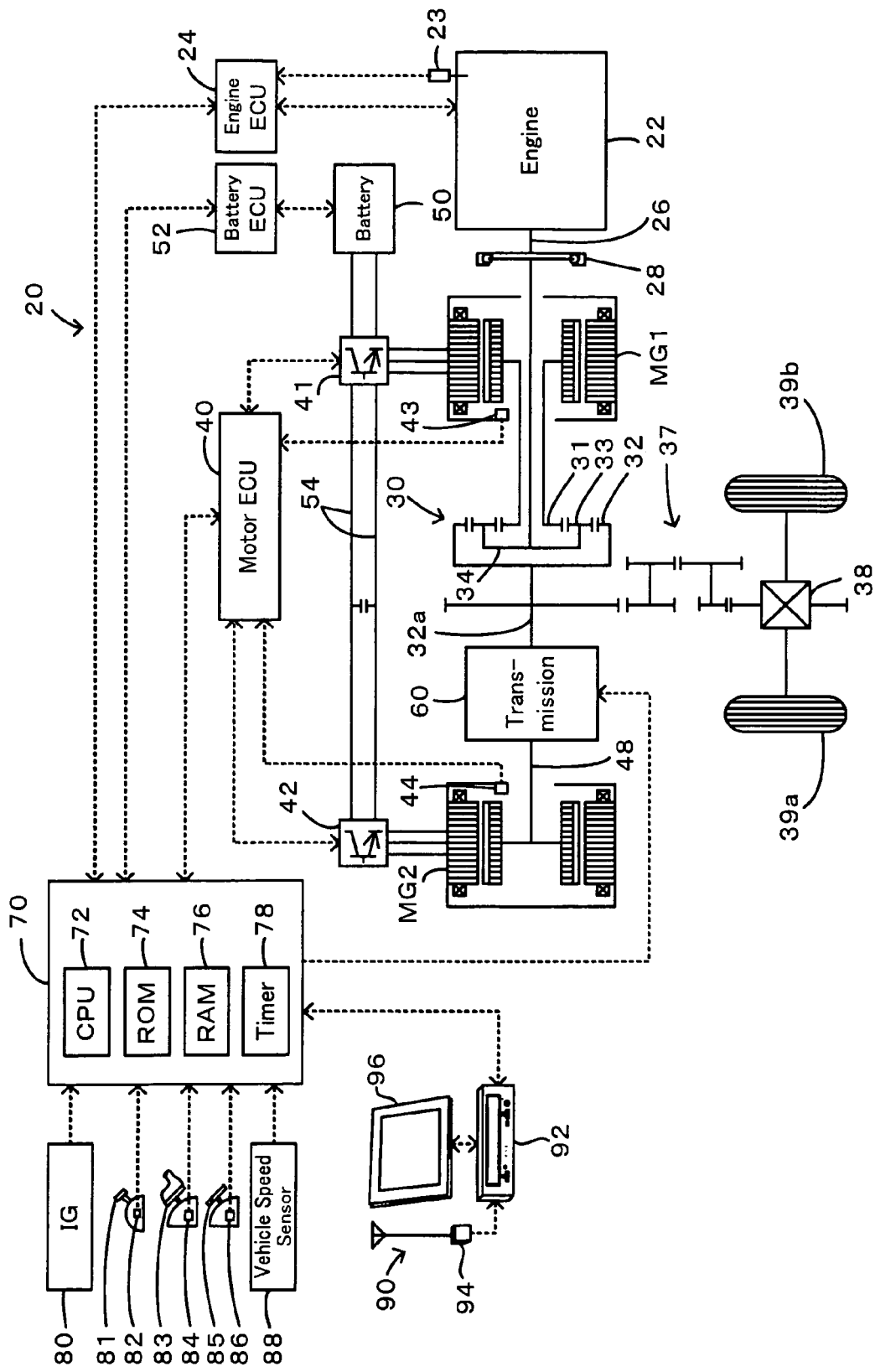
FIG. 1 is a block diagram to show the outline of the configuration of a hybrid vehicle 20 equipped with a power output apparatus as an embodiment of the present invention.

FIG. 1 is a block diagram to show the outline of the configuration of a hybrid vehicle 20 equipped with a power output apparatus as an embodiment of the present invention. The hybrid vehicle 20 of the embodiment includes as shown in the figure, an engine 22, a three shaft-type power distribution and integration mechanism 30 which is connected via a damper 28 to a crank shaft 26 as the output shaft of the engine 22, a motor MG1 which is connected to the power distribution and integration mechanism 30 and is capable of generating electric power, a motor MG2 which is connected to the power distribution and integration mechanism 30 via the transmission 60, and a hybrid electronic control unit 70 which controls the entire vehicle.

The engine 22 is an internal combustion engine which outputs power from the fuel of hydrocarbons such as gasoline and light oil, and is subjected to operation controls such as a fuel injection control and an ignition control, and an intake air flow adjusting control by an engine electronic control unit (hereinafter referred to as an "engine ECU") 24 which receives inputs from various sensors for detecting the operating states of the engine 22. The engine ECU 24 receives input such as a cooling water temperature tw from a temperature sensor 23 for detecting the temperature of the cooling water to cool the engine 22. The engine ECU 24 communicates with the hybrid electronic control unit 70 and controls the operation of the engine 22 with the control signal from the hybrid electronic control unit 70, as well as outputs data relating to the operating states of the engine 22 to the hybrid electronic control unit 70 as desired.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the transmission 60 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus transmitted to the driving wheels 39a and 39b via the gear mechanism 37, and the differential gear 38 from ring gear shaft 32a.

The motor MG1 and motor MG2 are both configured as a known synchronous motor generator, which can be driven as an electric generator and as an electric motor, and exchange power with a battery 50 via inverters 41 and 42. The power line 54 connecting the inverters 41, 42 and the battery 50 is configured as a positive electrode bus line and a negative electrode bus line, which are shared by each inverter 41, 42, and it is configured such that the power generated at one of the motors MG1 and MG2 can be consumed at the other motor. Therefore, the battery 50 is to be charged with power generated from the motors MG1 and MG2, and discharged due to the power shortage of the same. Moreover, if power transmission is balanced between the motors MG1 and MG2, the battery 50 will not be subjected to charging or discharging. The driving of both the motors MG1 and MG2 are controlled by a motor electronic control unit (hereinafter referred to as a "motor ECU") 40. The motor ECU 40 is input with signals which are needed to control the driving of the motors MG1 and MG2, for example, signals from rotational position detection sensors 43 and 44 which detect the rotational positions of the rotors of the motors MG1 and MG2, and a phase currents applied to the motors MG1 and MG2 and detected by a current sensor not shown; and the motor ECU 40 outputs switching control signals to the inverters 41 and 42. The motor ECU 40 calculates the rotation speeds Nm1 and Nm2 of the rotors of the motors MG1 and MG2 with a rotation speed calculation routine not shown based on the signals input from the rotational position detection sensors 43 and 44. The motor ECU 40 communicates with the hybrid electronic control unit 70, and controls the driving of the motors MG1 and MG2 with the control signals from the hybrid electronic control unit 70 as well as outputs data relating to the operating states of the motors MG1 and MG2 to the hybrid electronic control unit 70 as desired.

Figure 2:
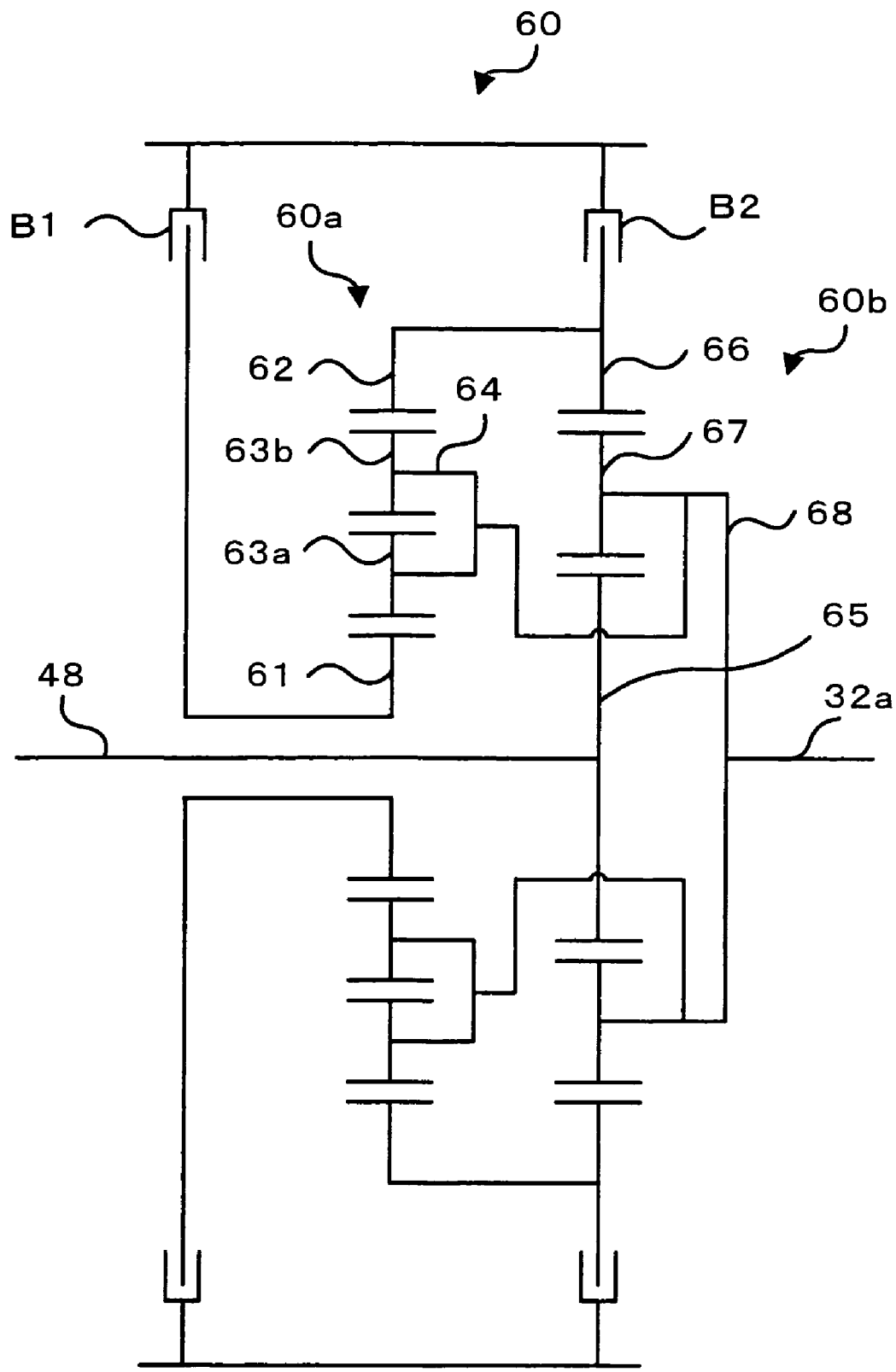
FIG. 2 is a block diagram to show the outline of the configuration of a transmission 60.

The transmission 60 is configured to connect and disconnect the rotating shaft 48 of the motor MG2 with and from a ring gear shaft 32a, and is capable of transmitting the connection of the both shafts to the ring gear shaft 32a by reducing the rotation speed of the rotating shaft 48 of the motor MG2 in two steps. FIG. 2 shows an example of the configuration of the transmission 60. The transmission 60 shown in FIG. 2 is made up of a planetary gear mechanism 60a of a double pinion type, a planetary gear mechanism 60b of a single pinion type, and two brakes B1 and B2. The planetary gear mechanism 60a of a double pinion type includes a sun gear 61 of an external gear type, a ring gear 62 of an internal gear type which is disposed concentrically with the sun gear 61, a plurality of first pinion gears 63a which engage with the sun gear 61, a plurality of second pinion gears 63b which engage with the first pinion gears 63a and the ring gear 62, and a carrier 64 which connects the plurality of first pinion gears 63a and the plurality of second pinion gears 63b to rotatably and revolvably hold them, wherein the rotation of the sun gear 61 is adapted to be freed or stopped by turning on/off the brake B1. The planetary gear mechanism 60b of a single pinion type includes a sun gear 65 that is an external gear, a ring gear 66 that is an internal gear and is disposed concentrically with the sun gear 65, a plurality of pinion gears 67 which engage with the sun gear 65 and with the ring gear 66, and a carrier 68 which holds the plurality of pinion gears 67 in such a manner as to allow free revolution thereof and free rotation thereof on the respective axes, wherein the sun gear 65 is connected to the rotating shaft 48 of the motor MG2 and the carrier 68 is connected to the ring gear shaft 32a respectively, and the rotation of the ring gear 66 is adapted to be freed or stopped by turning on/off the brake B2. The planetary gear mechanism 60a of a double pinion type and the planetary gear mechanism 60b of a single pinion type are connected to each other by the ring gears 62 and 66 and the carriers 64 and 68. The transmission 60 is capable of: disconnecting the rotating shaft 48 of the motor MG2 from the ring gear shaft 32a by turning off both the brakes B1 and B2; transmitting the rotation of the rotating shaft 48 of the motor MG2 to the ring gear shaft 32a at a relatively large speed reducing ratio by turning off the brake B1 and turning on the brake B2 (hereinafter, this state is referred to as a "state of Lo gear"); and transmitting the rotation of the rotating shaft 48 of the motor MG2 to the ring gear shaft 32a at a relatively small speed reducing ratio by turning on the brake B1 and turning off the brake B2 (hereinafter, this state is referred to as a "state of Hi gear"). The sate in which both the brakes B1 and B2 are turned on inhibits the rotation of the rotating shaft 48 and the ring gear shaft 32a. Turning on/off the brakes B1 and B2 in the embodiment is performed by adjusting the hydraulic pressure to act on the brakes B1 and B2 through the driving of a hydraulic actuator not shown.

The battery 50 is under control of a battery electronic control unit (hereinafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid vehicle 20 of the embodiment is equipped with a navigation apparatus 90 which outputs and displays a traveling route to a specified destination. This navigation apparatus 90 includes a main body 92 which contains a recording medium such as a hard disk in which map data and a route search program are stored, a GPS antenna 94 which receives data such as information relating to the current position of the vehicle, and a touch-panel type display 96 with which various instructions can be input by the operator.

The hybrid electronic control unit 70 is configured as a micro processor centered around the CPU 72 and includes, in addition to the CPU 72, a ROM 74 which stores processing programs, a RAM 76 which tentatively stores data, a timer 78 which keeps time based on instruction, and input/output and communication ports not shown. Via the input port, the hybrid electronic control unit 70 is input a rotation speed of the ring gear shaft 32a as the drive axis from a rotation speed sensor 36 (hereinafter, the rotation speed of the ring gear shaft 32a detected by the rotation speed sensor 36 is referred to as a detected rotation speed Nrdet), an ignition signal from an ignition switch 80, a shift position SP from a shift position sensor 82 which detects the operational position of a shift lever 81, an accelerator opening Acc from an accelerator-pedal position sensor 84 which detects an accelerator opening Acc in correspondence with the depression amount of the accelerator pedal 83, a brake pedal position BP from a brake pedal position sensor 86 which detects the depression amount of the brake pedal 85, a vehicle speed V from a vehicle speed sensor 88, data from the navigation apparatus 90 (main body 92), and others. Further, the hybrid electronic control unit 70 outputs a driving signal to an actuator not shown of the brake B1, B2 of the transmission 60, and others. Moreover, as describe above, the hybrid electronic control unit 70 is connected with the engine ECU 24, the motor ECU 40, and a battery ECU 52 via a communication port, and exchanges various control signals and data with the engine ECU 24, the motor ECU 40, and the battery ECU 52.

Thus configured hybrid vehicle 20 of the embodiment calculates the torque demand to be output to the ring gear shaft 32a as the drive shaft based on the accelerator opening Acc corresponding to the depression amount of the accelerator pedal 83 by the operator and the vehicle speed V, and controls the operation of the engine 22, the motor MG1, and the motor MG2 such that the power demand corresponding to the torque demand is output to the ring gear shaft 32a. The control of the operation of the engine 22, the motor MG1, and the motor MG2 includes: a torque conversion drive mode in which the operation of the engine 22 is controlled such that power in consistent with a power demand is output from the engine 22, and the motors MG1 and MG2 are driven and controlled such that all of the power output from the engine 22 undergoes a torque conversion by the power distribution and integration mechanism 30 and the motors MG1 and MG2, and is output to the ring gear shaft 32a; a charge-discharge operation mode in which the operation of the engine 22 is controlled such that a power consistent with the sum of the power demand and the power necessary for charging or discharging the battery 50 is output from the engine 22, and the motors MG1 and MG2 are driven and controlled such that the power demand is output to the ring gear shaft 32a accompanied by a torque conversion by the power distribution and integration mechanism 30 and the motors MG1 and MG2, of part or all of the power output from the engine 22 attended with the charging and discharging of the battery 50; and a motor operation mode in which the engine 22 is deactivated and the operation is controlled such that a power in consistent with the power demand from the motor MG2 is output to the ring gear shaft 32a.

Figure 3:
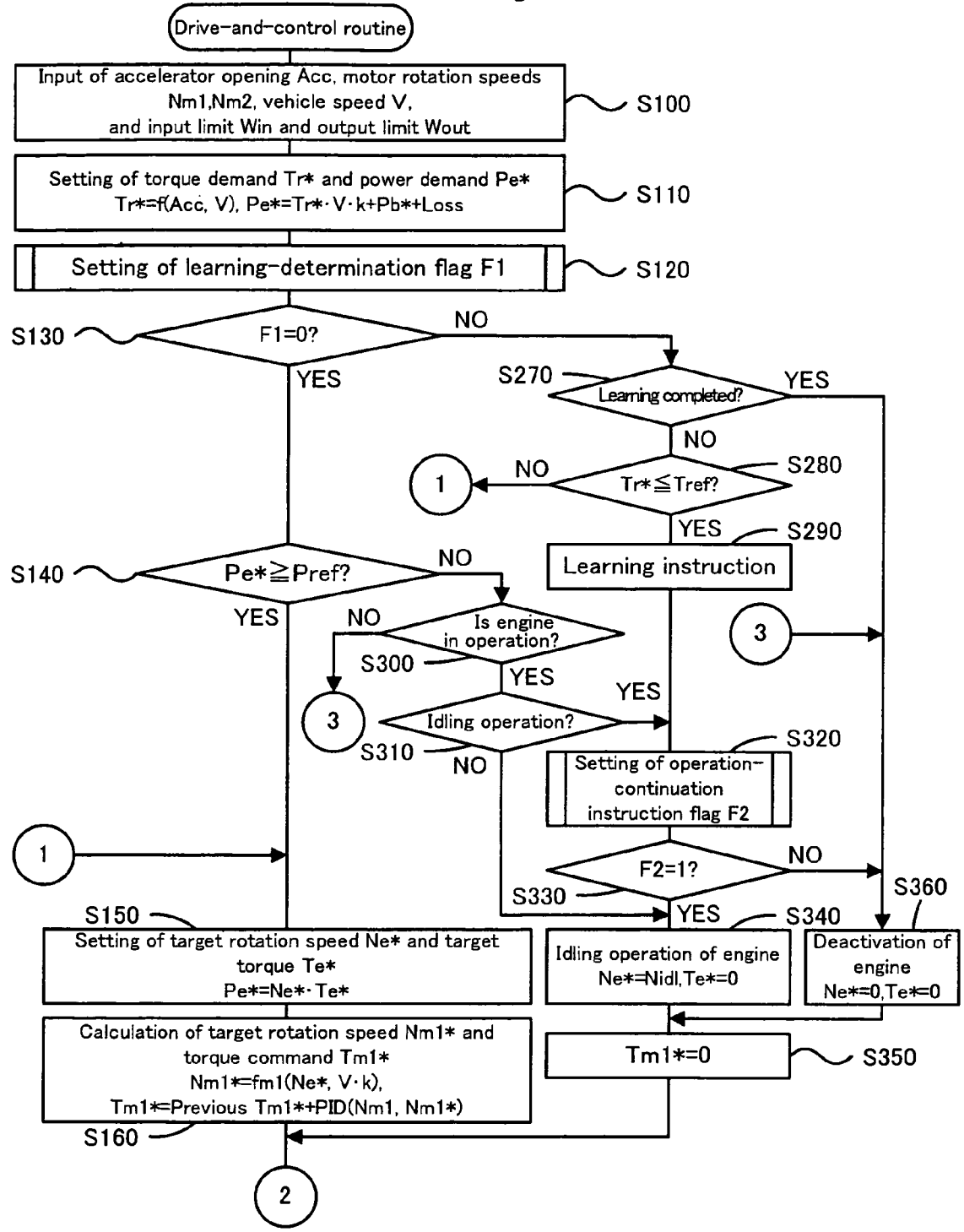
FIG. 3 is a flowchart to show part of an example of drive-and-control routine executed by a hybrid electronic control unit 70 of an embodiment.
Figure 4:
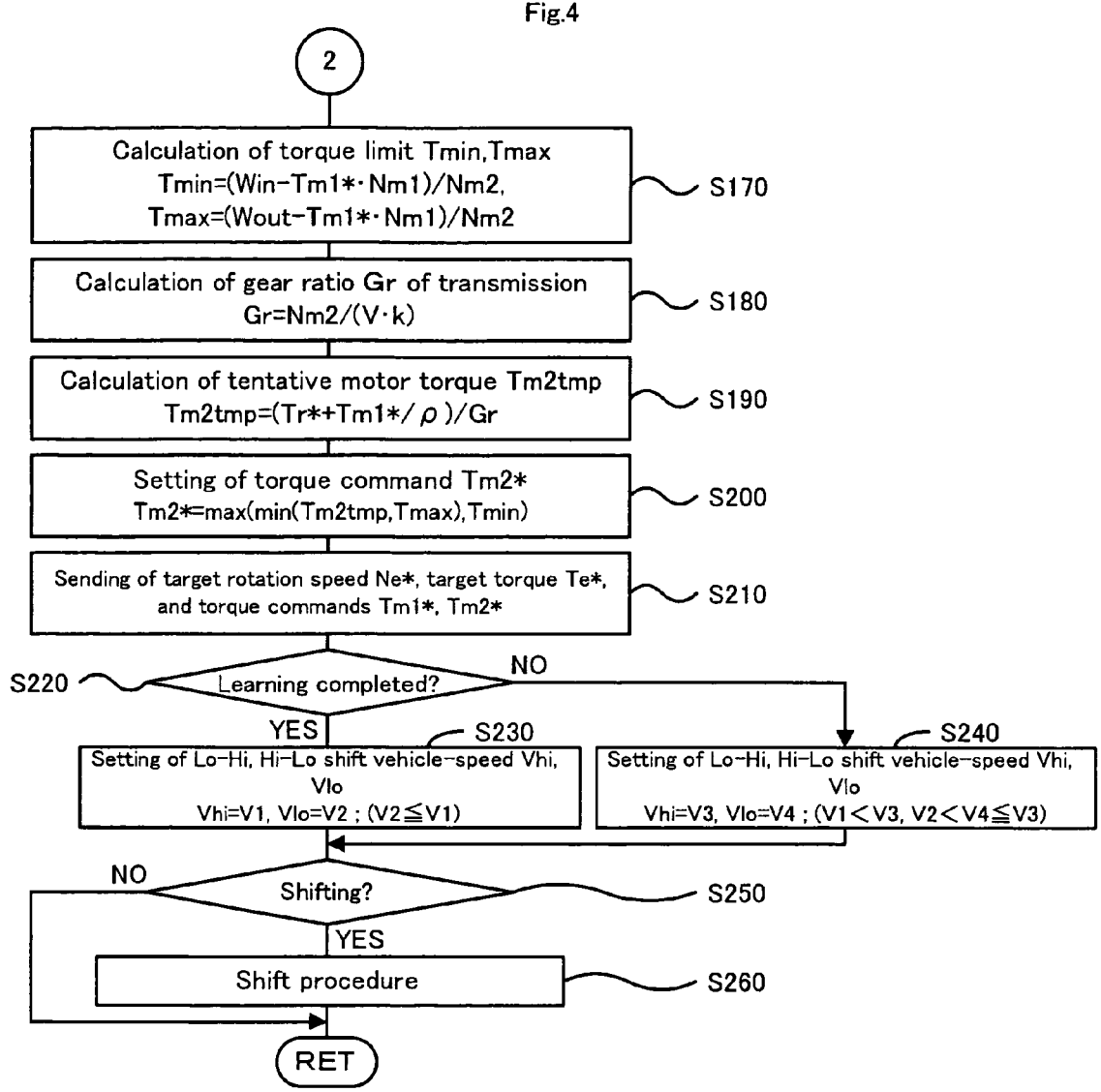
FIG. 4 is a flowchart to show part of an example of drive-and-control routine executed by a hybrid electronic control unit 70 of an embodiment.

Next, the operation of thus configured hybrid vehicle 20 will be described. FIGS. 3 and 4 are a flowchart to show an example of the drive-and-control routine to be executed by the hybrid electronic control unit 70. This routine is executed at a predetermined time interval (for example, at every several msec).

When the drive-and-control routine is executed, the CPU 72 of the hybrid electronic control unit 70 first executes the processing to input necessary data for the control such as the accelerator opening Acc from the accelerator-pedal position sensor 84, the vehicle speed V from the vehicle speed sensor 88, the rotation speeds Nm1 and Nm2 of the motors MG1 and MG2, and an input limit Win and an output limit Wout of the battery 50 (step S100). Where, an arrangement is made such that the rotation speed Ne of the engine 22 is calculated based on the signal from a crank position sensor 23 attached to the crankshaft 26, and the calculated value is input from the engine ECU 24 through communications. Moreover, rotation speeds Nm1 and Nm2 of the motors MG1 and MG2 are calculated based on the rotational positions of the rotors of the motors MG1 and MG2 detected by the rotational position detection sensors 43 and 44, and the calculated values are input from the motor ECU 40 through communications. Further, the output limit Wout of the battery 50 is set based on the cell temperature Tb of the battery 50 detected by a temperature sensor not shown and the state of charge (SOC) of the battery 50, and the set value is input from the battery ECU 52 through communications.

Figure 5:
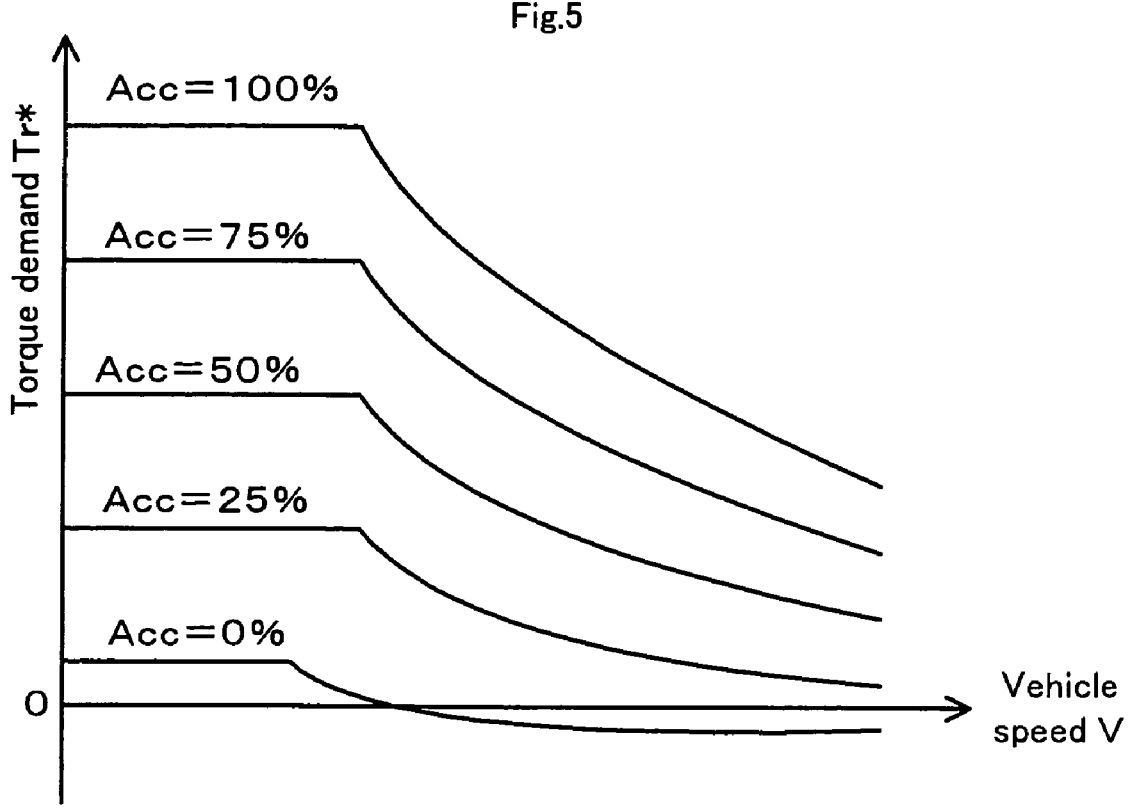
FIG. 5 is an explanatory diagram to show an example of a required torque setting map.

With the data thus being input, a torque demand Tr* as the torque required for the vehicle to be output to the ring gear shaft 32a as the drive shaft connected to the drive wheels 39a and 39b, and a power demand Pe* required for the vehicle are set based on the input accelerator opening Acc and the vehicle speed V (step S110). The torque demand Tr* is set in the embodiment such that the relationship between the accelerator opening Acc and the vehicle speed V and the torque demand Tr* is determined in advance and stored in a ROM 74 as a torque-demand setting map, and when the accelerator opening Acc and the vehicle speed V are given, a corresponding torque demand Tr* is derived from the stored map. FIG. 5 shows an example of the torque-demand setting map. The power demand Pe* can be calculated as the sum of: the product of the set torque demand Tr* and the rotation speed Nr of the ring gear shaft 32a; a charge-discharge power demand Pb* required by the battery 50; and a loss Loss. Here, the rotation speed Nr of the ring gear shaft 32a can be determined by multiplying the vehicle speed V with a conversion factor k.

Figure 6:
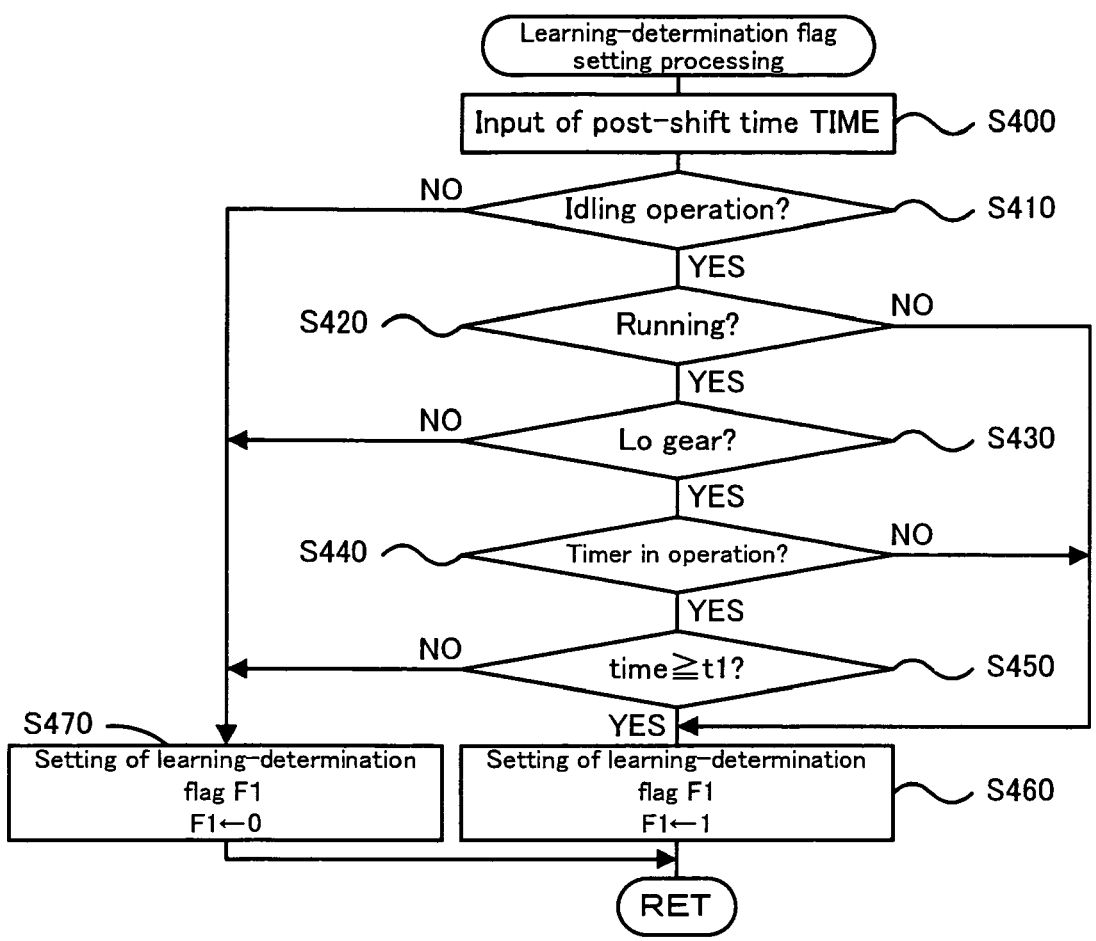
FIG. 6 is a flowchart to show an example of a learning-determination flag setting processing.

Then, by a learning-determination flag setting processing illustrated in FIG. 6, a learning-determination flag F1 is set, which indicates whether or not to learn an idling control value which is a control value of the idling operation of the engine 22 (step S120). Hereinafter, description of the drive-and-control routine of FIGS. 3 and 4 is temporarily suspended, and the learning-determination flag setting processing illustrated in FIG. 6 will be described.

In the learning-determination flag setting processing, first, a post-shift time TIME, is input (step S400). At this time, it is arranged that the value of a timer 78 which starts clocking when shifting of the shift range of the transmission 60 has been completed is input as the post-shift time TIME.

In this way, when the post-shift time TIME, is input, it is determined whether or not a learning condition for learning the idling control value of the engine 22 (hereinafter, referred to as a "learning condition of idling control value") is satisfied (step S410 to S450), and when it is determined that the learning condition of idling control value is satisfied, it is judged to perform the learning and a value 1 is set to a learning-determination flag F1 (step S460), and when it is determined that the learning condition of idling control value is not satisfied, it is judged not to perform the learning, and a value 0 is set to the learning-determination flag F1 (step S470), thereby finishing the learning-determination flag setting processing. In the determination of whether or not the learning condition of idling control value is satisfied, it is determined whether or not the engine 22 is in an idling operation (step S410); and when it is determined that the engine 22 is in an idling operation, it is determined whether the vehicle is running or at a standstill (step S420); and when it is determined that the vehicle is running, it is determined whether the transmission 60 is in the state of Lo gear or the state of Hi gear (step S430); and when it is determined that the transmission 60 is in the state of Lo gear, it is determined whether or not the timer 78 is in operation (step S440); and when it is determined that the timer 78 is in operation, the post-shift time TIME, is compared with a predetermined time t1 (step S450). Where, the determination of whether the vehicle is running or at a standstill in step S420 can be done based on, for example, whether or not the vehicle speed V is 0, whether or not the brake pedal position BP is not less than a predetermined value, etc. Further, the determination of whether or not the timer 78 is in operation in step S440 is a processing to determine whether or not shifting of the shift range of the transmission 60 has been performed since the ignition being turned on until the present. Further, the predetermined time t1 in step S450 is set as the time since shifting of the shift range of the transmission 60 is completed until when the rotation speed Nm2 of the motor MG2 and the like become stabilized, and it can be determined by the properties of the motor MG2 and the transmission 60 thereby being set to be, for example, 2, 3, or 4 seconds. The determinations of steps S440 and S450 are a processing to determine whether or not it is before a predetermined time t1 has elapsed since a Hi-Lo shifting being performed, that is, whether or not the rotation speed Nm2 of the motor MG2 and the like are unstable.

In steps S410 to S450, when it is determined that the engine 22 is in an idling operation, the vehicle is running, the transmission 60 is in the state of Lo gear, it is not before a predetermined time has elapsed since a Hi-Lo shifting being performed (the timer 78 is not in operation, or the timer 78 is in operation and the post-shift time TIME, is not less than the predetermined time t1), or when it is determined that the engine 22 is in an idling operation and the vehicle is at a standstill, it is determined that the learning condition of idling control value is satisfied and the learning is to be performed, and a value 1 is set to the learning-determination flag F1 (step S460), thereby finishing the learning-determination flag setting processing. On the other hand, when it is determined that the engine 22 is not in an idling operation, or that the engine 22 is in an idling operation and the vehicle is running, but the transmission 60 is in the state of Hi gear, or when it is determined that the engine 22 is in an idling operation, the vehicle is running, the transmission 60 is in the state of Lo gear, but it is before the predetermined time t1 has elapsed since a Hi-Lo shifting being performed (the timer 78 is in operation and the post-shift time TIME, is less than the predetermined time t1), it is determined that the learning condition of the idling control value is not satisfied and the learning is not to be performed, and a value 0 is set to the learning-determination flag F1 (step S470), thereby finishing the learning-determination flag setting processing. First, description will be made on the reason why the determination of whether the transmission 60 is in the state of Hi gear or in the state of Lo gear is made in step S430. Since the gear ratio Gr (the rotation speed Nm2 of the motor MG2/the rotation speed Nr of the ring gear shaft 32a) of the transmission 60 differs depending on the state of the gear (the state of Lo gear and the state of Hi gear), it is considered that when the motor MG2 is rotating, the effect of the driving state of the motor MG2 on the crankshaft 26 of the engine 22 via the transmission 60, the ring gear shaft 32a, the power distribution and integration mechanism 30, and the damper 28 may vary depending on the state of the gear of the transmission 60. For this reason, performing the learning of idling control value regardless of the state of the gear of the transmission 60 may result in variation in the learning value, making it impossible to perform an appropriate learning. In the embodiment, to avoid such an inconvenience, a determination is made on whether the transmission 60 is in the state of Lo gear or the state of Hi gear. This makes it possible to suppress the variation in the learning value due to the state of the gear of the transmission 60. Next, description will be made on the reason why the determination of whether or not it is before the predetermined time t1 has elapsed since a Hi-Lo shifting being performed is made in steps S440 and S450. When the rotation speed Nm2 of the motor MG2 and the like are not stabilized immediately after a Hi-Lo shifting has been performed, it is considered that the variation of the rotation speed Nm2 of the motor MG2 and the like may be transmitted to the crankshaft 26 of the engine 22 via the transmission 60, ring gear shaft 32a, the power distribution and integration mechanism 30, and the damper 28, thereby affecting the idling operation of the engine 22. Therefore, performing the learning of idling control value in such an instance may result in variation in the learning value, thereby making it impossible to perform an appropriate learning. In the embodiment, to avoid such an inconvenience, an arrangement is made that a determination is made on whether or not it is before the predetermined time t1 has elapsed since a Hi-Lo shifting being performed. This makes it possible to suppress the variation in the learning value caused by performing the learning before the predetermined time t1 has elapsed since a Hi-Lo shifting being performed. Next, description will be made on the reason why the determination is made on whether the vehicle is running or at a standstill in step S420. When the vehicle is at a standstill, since both the rotation speed Nr of the ring gear shaft 32a and the rotation speed Nm2 of the motor MG2 become a value 0 regardless of whether the transmission 60 is in the state of Lo gear or the state of Hi gear, and regardless of whether or not it is before the predetermined time t1 has passed since a Hi-Lo shifting being performed, it is considered that the variation in the learning value due to the state of the gear of the transmission 60 and the variation of the learning value caused by performing the learning before the predetermined time t1 has passed since a Hi-Lo shifting being performed will be smaller compared with that when the vehicle is running. Therefore, when the vehicle is at a standstill, it may be determined that the learning condition is satisfied regardless of whether the transmission 60 is in the state of Lo gear or in the state of Hi gear, and whether or not the predetermined time t1 has passed since a Hi-Lo shifting being performed, and a value 1 may be set in the learning-determination flag F1, thereby ensuring an opportunity to learn the idling control value. For this reason, in the embodiment, it is arranged to determine whether the vehicle is running or at a standstill.

Figure 7:
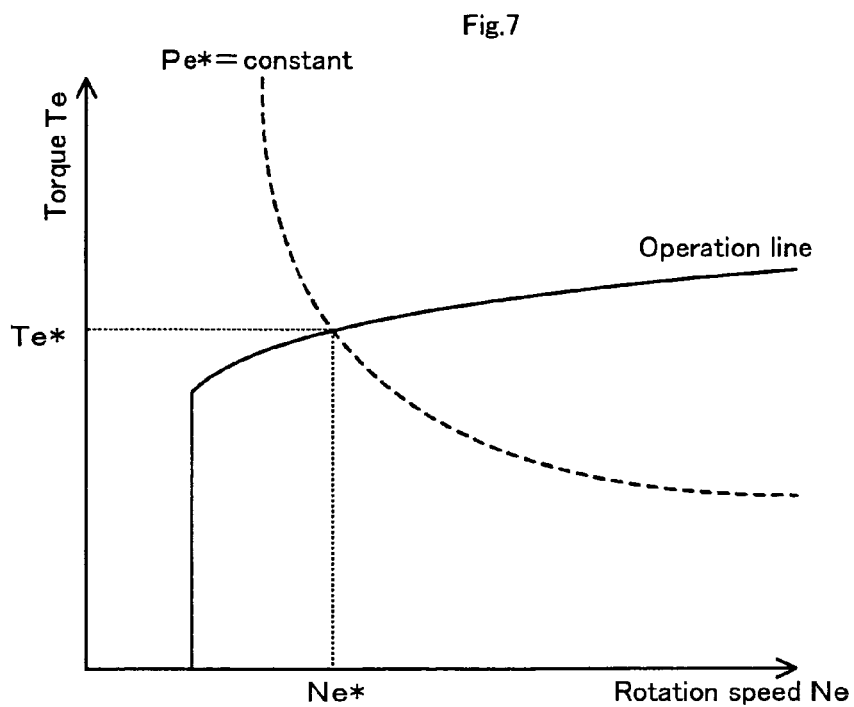
FIG. 7 is an explanatory diagram to show an example of the operation line of an engine 22 and the manner in which a target rotation speed Ne* and a target torque Te* are set.

Now return to the description of the drive-and-control routine in FIGS. 3 and 4. Upon setting the learning-determination flag F1 in step S120, the set value of the learning-determination flag F1 is checked (step S130), and when the learning-determination flag F1 is value 0, the learning condition of the idling control value is not satisfied and it is judged not to perform the learning, and the power demand Pe* is compared with a threshold value Pref (step S140). Where, the threshold value Pref is determined by the properties of the engine 22 and the like and is set to be such as a lowest value of the power at which the engine 22 can be efficiently operated. When the power demand Pe* is not less than the threshold value Pref, the target rotation speed Ne* and the target torque Te* of the engine 22 are set based on the power demand Pe* (step S150). Through this setting, the target rotation speed Ne* and the target torque Te* are set based on the operation line for efficiently operating the engine 22 and the power demand Pe*. FIG. 7 shows one example of the operation line of the engine 22 and a manner of setting the target rotation speed Ne* and the target torque Te*. As shown in the figure, the target rotation speed Ne* and the target torque Te* can be determined from the intersection point between the operation line and a curve on which the power demand Pe* (Ne*×Te*) is constant.

Figure 8:
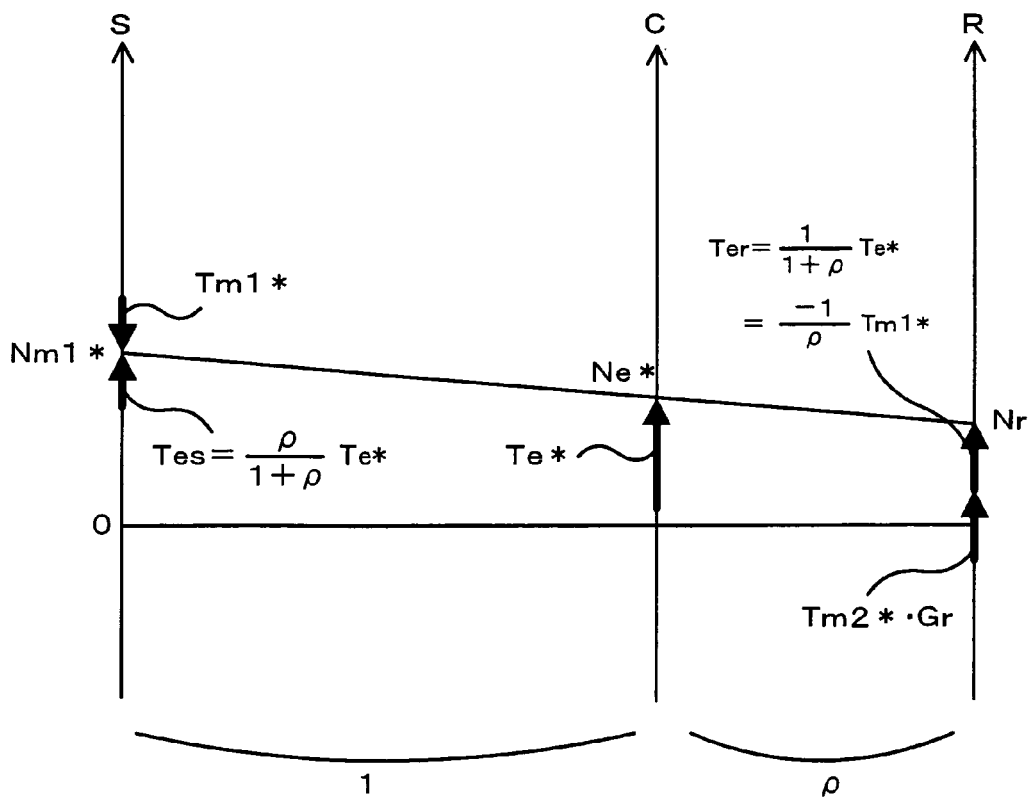
FIG. 8 is an explanatory diagram to show an example of an alignment chart to kinematically explain a rotational element of a power distribution and integration mechanism 30.

Upon setting the target rotation speed Ne* and the target torque Te* of the engine 22, the target rotation speed Nm1* of the motor MG1 is calculated by the following equation (1) using the set target rotation speed Ne* of the engine 22, the rotation speed Nr (=V·k) of the ring gear shaft 32a, and the gear ratio ρ of the power distribution and integration mechanism 30, and a torque command Tm1* of the motor MG1 is calculated by the equation (2) based on the calculated target rotation speed Nm1* and the current rotation speed Nm1 (step S160). Where the equation (1) represents a kinetic relationship for the rotational element of the power distribution and integration mechanism 30. FIG. 8 shows an alignment chart to show a kinetic relationship between the rotation speed and the torque in the rotational elements of the power distribution and integration mechanism 30. In the figure, the S axis on the left represents the rotation speed of, the sun gear 31, which is rotational speed Nm1 of the motor MG1, the C axis represents the rotation speed of the carrier 34, which is the rotation speed Ne of the engine 22, and the R axis represents the rotation speed Nr of the ring gear 32 (ring gear shaft 32a). The equation (1) can be easily derived by using this alignment chart. Further, two thick arrows on the R axis represent the torque which occurs as the result of the torque Te* output from the engine 22 when the engine 22 is operated in a steady state at an operation point of a target rotation speed Ne* and a target torque Te* being transmitted to ring gear shaft 32a, and the torque which occurs as the result of the torque Tm2* output from the motor GM2 acting on the ring gear shaft 32a via the transmission 60. Furthermore, the equation (2) represents a relationship in a feedback control for rotating the motor MG1 at a target rotation speed Nm1*, where the second term "k1" on the right hand side is a gain of a proportional term and the third term "k2" of the right hand side is a gain for the integration term.

$$Nm1^* = Ne^* \cdot (1+\rho)/\rho - V \cdot k/\rho \quad (1)$$

$$Tm1^* = \text{Previous } Tm1^* + k1(Nm1^* - Nm1) + k2\int(Nm1^* - Nm1)dt \quad (2)$$

Having thus calculated the target rotation speed Nm1* and the torque command Tm1* of the motor MG1, torque limits Tmin and Tmax, which are lower and upper limits of the torque which may be output from the motor MG2, are calculated from the following equations (3) and (4) by dividing the deviation between the input limit Win and output limit Wout of the battery 50 and the power consumption (generated power) of the motor MG1, which is obtained by multiplying the calculated torque command Tm1* of the motor MG1 by the current rotation speed Nm1 of the motor MG1, by the rotation speed Nm2 of the motor MG2 (step S170); the current gear ratio Gr of the transmission 60 is calculated by diving the rotation speed Nm2 of the motor MG2 by the rotation speed Nr (=V·k) of the ring gear shaft 32a (step S180); a tentative motor torque Tm2tmp as the torque to be output from the motor MG2 is calculated by the equation (5) using the calculated current gear ratio Gr, the torque demand Tr*, the torque command Tm1*, and the gear ratio ρ of the power distribution and integration mechanism 30 (step S190); and the torque command Tm2* of motor MG2 is set as the value to limit the tentative motor torque Tm2tmp with calculated torque limits Tmin and Tmax (step S200). Thus, by setting the torque command Tm2* of the motor MG2, it is possible to set the torque demand Tr*, which is to be output to the ring gear shaft 32a as the drive shaft, as a torque which is limited within a range of the input limit Win and output limit Wout of the battery 50. Further, the equation (5) can be derived easily from the alignment chart of FIG. 8 described above.

$$Tmin = (Win - Tm1^* \cdot Nm1)/Nm2 \quad (3)$$

$$Tmax = (Wout - Tm1^* \cdot Nm1)/Nm2 \quad (4)$$

$$Tm2tmp = (Tr^* + Tm1^*/\rho)/Gr \quad (5)$$

Upon thus setting the target rotation speed Ne* and the target torque Te* of the engine 22, and the torque commands Tm1* and Tm2* of the motors MG1 and MG2, the target rotation speed Ne* and the target torque Te* of the engine 22 are sent to the engine ECU 24, and the torque commands Tm1* and Tm2* of the motors MG1 and MG2 are sent to the motor ECU 40 respectively (step S210), thereby finishing the drive-and-control routine. Upon receiving the target rotation speed Ne* and the target torque Te*, the engine ECU 24 performs controls in the engine 22 such as a fuel injection control and an ignition control such that the engine 22 is operated at the operation point indicated by the target rotation speed Ne* and the target torque Te*. Further, upon receiving the torque commands Tm1* and Tm2*, the motor ECU 40 performs switching control of the switching elements of the inverters 41 and 42 such that the motor MG1 is driven by the torque command Tm1* and the motor MG2 by the torque command Tm2*.

Figure 9:
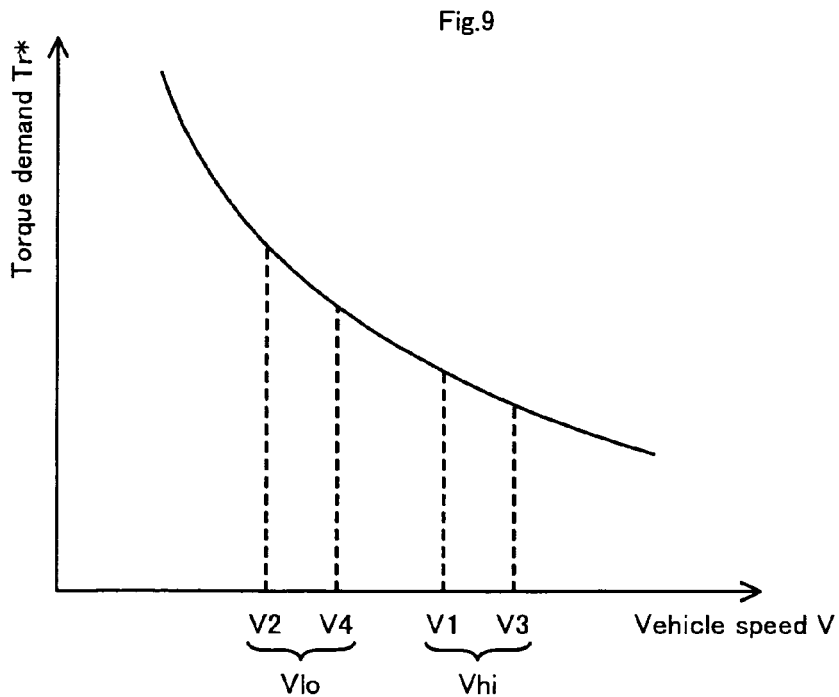
FIG. 9 is an explanatory diagram to show an example of shift map for use in performing the shifting of the transmission 60.

Next, it is determined whether or not the learning of the idling control value has been completed (step S220). This determination can be performed by inputting, from the engine ECU 24 via communications, for example, a flag to which a value 0 is set when the learning is not completed and a value 1 is set when the learning is completed, and checking the input value of the flag. When it is determined that the learning of the idling control value is completed, a vehicle speed V1 of normal time is set to a Lo-Hi shift line Vhi as the vehicle speed at which the transmission 60 is to be shifted from the state of Lo gear to the state of Hi gear, and a vehicle speed V2 of normal time which is not more than the vehicle speed V1 is set to a Hi-Lo shift line Vlo as the vehicle speed at which the transmission 60 is to be shifted from the state of Hi gear to the state of Lo gear (step S230). On the other hand, when it is determined that the learning of the idling control value has not been completed, a vehicle speed V3 which is larger than the vehicle speed V1 is set at the Lo-Hi shift line Vhi and a vehicle speed 4 which is larger than the vehicle speed V2 and not larger than the vehicle speed V3 is set at the Hi-Lo shift line Vlo (step S240). Then, it is determined whether or not to perform the shifting of the transmission 60 by using the set Lo-Hi shift line Vhi and the Hi-Lo shift line Vlo (step S250), and when it is determined to perform the shifting of the transmission 60, the shift procedure is executed (step S260) thereby finishing the drive-and-control routine, and when it is determined not to perform the shifting of the transmission 60, the drive-and-control routine is finished without performing the shifting of the transmission 60. FIG. 9 shows one example of the shift map in performing the shifting of the transmission 60. In the example of FIG. 9, when the vehicle speed V increases exceeding the Lo-Hi shift line Vhi while the transmission 60 is in the state of Lo gear, it is determined to perform the Lo-Hi shifting which shifts the transmission 60 from the state of Lo gear to the state of Hi gear, and when the vehicle speed V decreases exceeding the Hi-Lo shift line Vlo while the transmission 60 is in the state of Hi gear, it is determined to perform the Hi-Lo shifting which shifts the transmission 60 from the state of Hi gear to the state of Lo gear. In the shift procedure, when performing a Lo-Hi shifting, the state in which the brake B1 is OFF and the brake B2 is ON is changed to the state in which the brake B1 is ON and the brake is ON, and when performing a Hi-Lo shifting, the state in which the brake B1 is ON and the brake B2 is OFF to the state in which the brake B1 is OFF and the brake B2 is ON. Then, upon completion of the change, the clocking of the timer 78 is started as described above. Thus Setting the Lo-Hi shift line Vhi and the Hi-Lo shift line Vlo increases the range of the vehicle speed V at which the transmission 60 is to be in the state of Lo gear when the learning of the idling control value has not been completed compared with when the learning has been completed. As described above, since the learning condition of the idling control value includes the condition that the transmission 60 is in the state of Lo gear, it is possible to increase the range of the vehicle speed V at which the learning condition of the idling control value is likely to be satisfied by increasing the range of the vehicle speed V at which the transmission 60 is to be in the state of Lo gear when the learning of the idling control value has not been completed compared with when the learning has been completed, thereby ensuring more opportunity to perform the learning of the idling control value.

When the power demand Pe* is less than the threshold value Pref in step S140, it is determined whether or not the engine 22 is in operation (step S300), and when determined that the engine 22 is in operation, it is determined whether or not the engine 22 is in an idling operation, that is, whether or not the operation state of the engine 22 is changed from the state of being operated at an effective operation point based on the power demand Pe* to the state of being in an idling operation (step S310), and when determined that the engine 22 is not in an idling operation (for example, immediately after the power demand Pe* decreases crossing over the threshold value Pref), an idling rotation speed Nid1 is set to the target rotation speed Ne* of the engine 22 such that the engine 22 is put into an idling operation (step S340), and a value 0 is set to the torque command Tm1* of the motor MG1 (step S350), thereafter performing the procedures after step S170.

Figure 10:
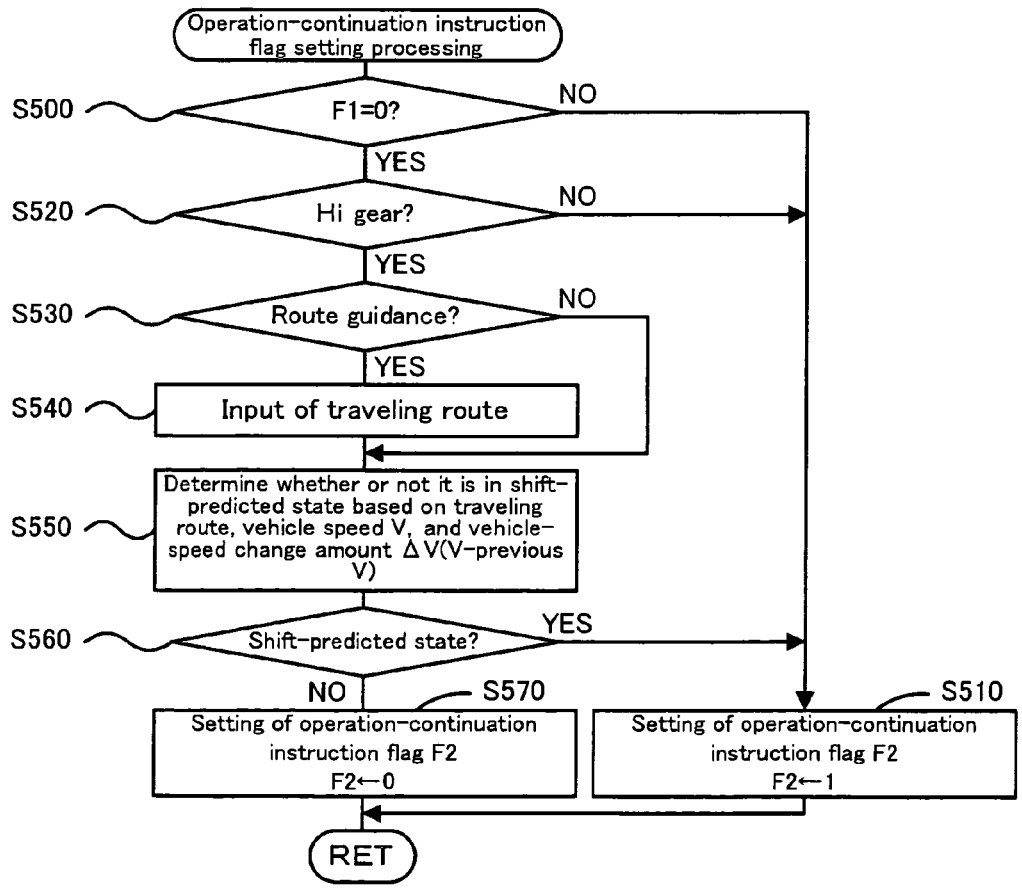
FIG. 10 is a flowchart to show an example of operation-continuation instruction flag setting processing.

When it is determined that the engine 22 is in an idling operation in step S310, through an operation-continuation instruction flag setting processing illustrated in FIG. 10, an operation-continuation instruction flag F2 (a flag to which a value 1 is set when the continuation of operation of the engine 22 is instructed, and a value 0 is set when the continuation of operation is not instructed) indicating whether or not to continue the operation of the engine 22 is set (step S320), and the set value of the operation-continuation instruction flag F2 is checked (step S330), and when the operation-continuation instruction flag F2 is a value 1, it is judged that the continuation of the operation of the engine 22 is instructed, and the idling rotation speed Nidl is set to the target rotation speed Ne* of the engine 22 (step S340) to cause the engine 22 to idle, and a value 0 is set to the torque command Tm1* of the motor MG1 (step S350), thereafter performing the procedures after step S170. In this case, the engine 22 is continuously operated in an idling state and the torque demand Tr* is output from the motor MG2 to the ring gear shaft 32a as the drive shaft. On the other hand, when the operation-continuation instruction flag F2 is a value 0 in step S330, it is judged that the continuation of operation of the engine 22 is not instructed, and a value 0 is set to the target rotation speed Ne* and the target torque Te* of the engine 22 such that the engine 22 is stopped (step S360), and a value 0 is set to the torque command Tm1* of the motor MG1 (step S350), thereafter performing the procedures after step S170. In this case, the engine 22 is stopped and the torque demand Tr* is output from the motor MG2 to the ring gear shaft 32a as the drive shaft. Therefore, the engine 22 is to be operated intermittently thereby improving the energy efficiency. In this way, with the engine 22 being stopped, when this routine is executed next time, it is judged that the engine 22 is not operated, i.e. is stopped in step S300, and the stopping of the engine 22 is continued (step S360). Hereinafter, the description on the drive-and-control routine of FIGS. 3 and 4 will be suspended temporarily and the operation-continuation instruction flag setting processing of FIG. 10 will be described.

In the operation-continuation instruction flag setting processing, first, the value of the learning-determination flag F1 is checked (step S500), and when the learning-determination flag F1 is a value 1, it is judged that the learning condition of the idling control value is satisfied, and a value 1 is set to the operation-continuation instruction flag F2 to perform the learning of the idling control value describe below (step S510), thereby finishing the operation-continuation instruction processing.

On the other hand, when the learning-determination flag F1 is a value 0, it is judged that the learning condition of the idling control value is not satisfied, and it is determined whether the transmission 60 is in the state of Lo gear or in the sate of Hi gear (step S520), and when determined that the transmission 60 is in the state of Hi gear, it is determined whether or not it is in a shift-predicted state in which a Hi-Lo shifting is predicted to be performed within a predetermined time (step S530 to S560). When it is determined that the transmission 60 is in the state of Lo gear, or when it is determined that the transmission 60 is in the state of Hi gear and it is in a shift-predicted state, a value 1 is set to the operation-continuation instruction flag F2 (step S510), thereby finishing the operation-continuation instruction flag setting processing; and when it is determined that the transmission 60 is in the state of Hi gear and it is not in a shift-predicted state, a value 0 is set to the operation-continuation instruction flag F2 (step S570), thereby finishing the operation-continuation instruction flag setting processing. In this respect, since it is arranged in the embodiment that the operation-continuation instruction flag setting processing is performed when the engine 22 is in an idling operation, the determination of whether the transmission 60 is in the state of Lo gear or in the state of Hi gear in step S520 when the learning-determination flag F1 is a value 0 in step S500 is the determination of if the vehicle is running and it is before a predetermined time t1 has elapsed since a Hi-Lo shifting being performed, or if the vehicle is running and the transmission 60 is in the state of Hi gear. First, description will be made on the case in which the engine 22 is in an idling operation when the vehicle is running and it is before the predetermined time t1 has elapsed since a Hi-Lo shifting being performed, and thereafter description will be made on the case in which the engine 22 is in an idling operation when the vehicle is running and the transmission 60 is in the state of Hi gear.

First, consider a case in which the engine 22 is in an idling operation when the vehicle is running and it is before the predetermined time t1 has elapsed since a Hi-Lo shifting being performed. At this time, as described above, although it is judged that the learning condition of the idling control value is not satisfied in the learning-determination flag setting processing in FIG. 6 and a value 0 is set to the learning-determination flag F1, a value 1 is set to the learning-determination flag F1 after waiting until the predetermined time t1 has elapsed since a Hi-Lo shifting being performed. For this reason, it is arranged in the embodiment such that, when the transmission 60 is in the state of Lo gear in step S520, a value 1 is set to the operation-continuation instruction flag F2 in preparation for that the learning condition of the idling control value is satisfied. Thereby, it is possible to more reliably ensure the opportunity for learning the idling control value.

Next, consider a case in which the engine 22 is in an idling operation when the vehicle is running and the transmission 60 is in the state of Hi gear. At this time, it is determined that the transmission 60 is in the state of Hi gear in step S520, and it is determined whether or not a route guidance is performed by a navigation apparatus 90 (step S530); and when it is determined that a route guidance is being performed by the navigation apparatus 90, a traveling route is input (step S540), and when the route guidance is not performed, the traveling route is not input. And it is determined whether or not it is in a shift-predicted state in which a Hi-Lo shifting is predicted to be performed within a predetermined time (step S550, S560) based on, when a route guidance is not being performed, the vehicle speed V and the vehicle-speed change amount ΔV which is calculated by subtracting a previous vehicle speed from a current vehicle speed, and in addition to these, a traveling route to a destination, when a route guidance is performed by a navigation apparatus 90. And when it is determined that it is in a shift-predicted state, a value 1 is set to the operation-continuation instruction flag F2 (step S510), and when it is determined that it is not in a shift-predicted state, a value 0 is set to the operation-continuation instruction flag F2 (step S570). At this point, the determination of step S530 on whether or not the route guidance is being performed can be done by: for example, inputting a flag, to which a value 1 is set when a traveling route from the current position to a destination is output and displayed, and a value 0 is set when a traveling route is not output and displayed, from the navigation apparatus 90 (main body 92) through communications;

and checking the input value of the flag. Further the determination of step S550, S560 on whether or not it is in a shift-predicted state can be done by, for example, determining whether or not the vehicle speed V is within a predetermined range which is slightly larger than a Hi-Lo shift line Vlo, or determining whether or not the operator is demanding a rapid deceleration by determining whether or not the vehicle-speed change amount ΔV is not larger than a negative predetermined value, or determining whether or not a traveling at a relatively low speed is predicted by determining whether or not the traveling route from the current position to a destination is mainly in a city area. In this way, even when the learning-determination flag F1 is a value 0 and the transmission 60 is in the state of Hi gear, it is possible to prepare for the case in which the learning condition of the idling control value is satisfied after a Hi-Lo shifting being performed by instructing the continuation of the operation of the engine 22 when it is in a shift-predicted state in which a Hi-Lo shifting is predicted to be performed within a predetermined time, thereby ensuring more opportunity for learning the idling control value.

Now return to the description of the drive-and-control routine of FIGS. 3 and 4. When the learning-determination flag F1 is a value 1 in step S130, it is judged that the learning condition of the idling control value is satisfied, and it is determined whether or not the learning of the idling control value is completed (step S270), and when it is determined that the learning of the idling control value is not completed, the torque demand Tr* is compared with the threshold value Tref (step S280). Where, the threshold value Tref is to be used for determining whether or not the learning of the idling control value can be continued and is set at, for example, an upper limit value of the torque which can be output from the motor MG2 to the ring gear shaft 32a as the drive shaft, or a value close thereto. Therefore, the comparison of torque demand Tr* with the threshold value Tref in step S280 is to determine whether or not it is possible to output the torque demand Tr* from the motor MG2 to the ring gear shaft 32a and to put the engine 22 into an idling operation, that is, to determine whether or not the idling operation of the engine 22 is permitted. When the torque demand Tr* is less than the threshold value Tref, it is judged that the idling operation of the engine 22 is permitted, and a learning instruction is sent to the engine ECU 24 such that the learning of the idling control value is performed (step S290). And, as described above, since when the learning-determination flag F1 is a value 1, a value 1 is set in the operation-continuation instruction determination flag F2 (step S320, S330), the target rotation speed Ne* and the target torque Te* of the engine 22 are set such that the engine 22 is operated in an idling state (step S340), and a value 0 is set to the torque command Tm1* of the motor MG1 (step S350), thereafter performing the procedures after the aforementioned step S170. Upon receiving the instruction of learning, the engine ECU 24 performs the learning of the control value (for example, a throttle opening of a throttle valve not shown) which is needed to adjust the idling rotation speed of the engine 22 at a target idling rotation speed and stores that value to use it for the control of the idling operation of the engine 22 from the next time. Thereby, it is possible to make the idling operation of the engine 22 more appropriate.

When it is determined that the learning of the idling control value has been completed in step S270, a value 0 is set to both of the target rotation speed Ne* and the target torque Te* of the engine 22 such that the engine 22 of the idling control value is stopped (step S360), and a value 0 is set to the torque command Tm1* of the motor MG1 (step S350), thereafter performing the procedures after step S170. Upon the engine 22 thus being stopped, it is determined that the learning condition of idling control value is not satisfied when this routine is executed next time, and a value 0 is set to the learning-determination flag F1 in step S120.

Let consider a case in which the power demand Pe* decreases crossing over the threshold value Pref and the engine 22 is in an idling operation. When the learning condition of idling control value is satisfied while the engine 22 is in an idling operation, the learning of the idling control value is performed until the learning is completed, and the engine 22 is stopped when the learning is completed. In the embodiment, as described above, when the vehicle is running, it is determined that the learning condition of idling control value is satisfied and the learning is to be performed, when the engine 22 is in an idling operation and the transmission 60 is in the state of Lo gear and it is not before a predetermined time t1 has elapsed since a Hi-Lo shifting is performed, it is possible to suppress the variation of the learning value compared with the cases in which it is determined to perform the learning regardless of whether the transmission 60 is in the state of Lo gear or in the state of Hi gear, or it is determined to perform the learning even when it is before the predetermined time t1 has elapsed since a Hi-Lo shifting being performed. Further when the vehicle is at a standstill, it is determined that the learning condition is satisfied when the engine 22 is in an idling operation regardless of whether the transmission 60 is in the state of Lo gear or in the state of Hi gear, or whether or not it is before the predetermined time t1 has elapsed since a Hi-Lo shifting being performed, thereby ensuring the opportunity for learning.

On the other hand, when the learning condition of idling control value is not satisfied while the engine 22 is in an idling operation, the idling operation is continued when the continuation of the operation of the engine 22 is instructed, and the engine 22 is stopped when the continuation of the operation is not instructed. Since this will cause the engine 22 to be intermittently operated when the continuation of the operation of the engine 22 is not instructed, it becomes possible to improve the energy efficiency. Further, since the continuation of the operation of the engine 22 is instructed when it is before the predetermined time t1 has elapsed since a Hi-Lo shifting being performed, or when the transmission 60 is in the state of Hi gear and it is in a shift-predicted state, it is possible to prepare for the case in which the learning condition of idling control value is satisfied, thereby ensuring more opportunity for the learning.

When the torque demand Tr* is not smaller than the threshold value Tref in step S280, that is, when a relatively large torque is required on the ring gear shaft 32a as the drive shaft when the learning of the idling control value has not been completed, it is judged that the idling operation of the engine 22 is not to be permitted, and the procedures after step S150 described above are performed. In this case, the idling operation of the engine 22 and the learning of the idling control value are interrupted, and the torque demand Tr* is output to the ring gear shaft 32a by the torque to be output to the ring gear shaft 32a from the engine 22 via the power distribution and integration mechanism 30 and the torque to be output to the ring gear shaft 32a from the motor MG2 via the transmission 60. When the idling operation of the engine 22 is interrupted in this way, a value 0 is set to the learning-determination flag F1 in step S120 when the drive-and-control routine of FIGS. 3 and 4 is performed next time, and it is determined that the learning condition of idling control value is not satisfied.

According to the hybrid vehicle 20 of the above described embodiment, since it is determined that the learning condition for learning the idling control value, which is a control value of the idling operation of the engine 22, is satisfied when both of the condition that the engine 22 is in an idling operation and the condition that the transmission 60 is in the state of Lo gear are satisfied, and the learning of the idling control value is performed, it is possible to suppress the variation of the learning value due to the state of the gear of the transmission 60 compared with when the learning of the idling control value is performed regardless of the state of the gear of the transmission 60, thereby making the learning of the idling control value more appropriate.

Further, according to the hybrid vehicle 20 of the embodiment, since the learning of the idling control value is not performed when the condition that a predetermined time t1 has not elapsed since a Hi-Lo shifting being performed is satisfied even when the condition that the ending 22 is in an idling operation and the condition that the transmission 60 is in the state of Lo gear are both satisfied, it is possible to suppress the variation of the learning value due to the fact that the learning of idling control value is performed before the predetermined time t1 has elapsed since a Hi-Lo shifting being performed.

Further, according to the hybrid vehicle 20 of the embodiment, since when the condition that engine 22 is in an idling operation and the condition that the vehicle is at a standstill are both satisfied, the learning of the idling control value is performed regardless of whether or not the condition that the transmission 60 is in the state of Lo gear is satisfied and whether or not the condition that the predetermined time t1 has not elapsed since a Hi-Lo shifting being performed is satisfied, it is possible to ensure more opportunity for learning the idling control value.

Further, according to the hybrid vehicle 20 of the embodiment, since the engine 22 is continuously operated when it is in a shift-predicted state in which a Hi-Lo shifting is expected to be performed within a predetermined time even when the transmission 60 is in the state of Hi gear, it is possible to prepare for the case in which the learning condition of idling control value is satisfied after a Hi-Lo shifting is performed, thereby ensuring more opportunity for learning the idling control value.

According to the hybrid vehicle 20 of the embodiment, since when the learning of the idling control value has not been completed, the Lo-Hi shift line Vhi and the Hi-Lo shift line Vlo are set at higher vehicle speeds compared with when the learning has been completed, the range of the vehicle speed V at which the transmission 60 should be in the state of Lo gear becomes larger compared with when the learning has been completed, making it possible to ensure more opportunity for learning the idling control value.

In the hybrid vehicle 20 of the embodiment, although it is arranged that determination is made on if the timer 78 is in operation in step S440 of the learning-determination flag setting processing of FIG. 6 and determination is also made on whether or not it is before the predetermined time t1 has elapsed since a Hi-Lo shifting being performed by comparing the post-shift time TIME, with the predetermined time t1 in step S450, it may also be arranged that these determinations are not performed.

In the hybrid vehicle 20 of the embodiment, although it is arranged that determination is made on whether the vehicle is running or at a standstill in step S420 of the learning-determination flag setting processing of FIG. 6, it may also be arranged that the aforementioned determination is not performed.

In the hybrid vehicle 20 of the embodiment, although it is arranged that when the vehicle is at a standstill, a value 1 is set to the learning-determination flag F1 regardless of whether the transmission 60 is in the state of Lo gear or in the state of Hi-gear and regardless of whether or not it is before the predetermined time t1 has elapsed since a Hi-Lo shifting being performed, it may also be arranged such that the learning-determination flag F1 is set based only on whether or not it is before the predetermined time t1 has elapsed since a Hi-Lo shifting being performed regardless of whether the transmission 60 is in the state of Lo gear or in the state of Hi gear, or such that the learning-determination flag F1 is set based only on whether the transmission 60 is in the state of Lo gear or in the state of Hi gear regardless of whether or not it is before the predetermined time t1 has elapsed since a Hi-Lo shifting being performed.

In the hybrid vehicle 20 of the embodiment, although it is arranged that when the power demand Pe* decreases crossing over the threshold value Pref, the operation-continuation instruction flag F2 is set waiting until the engine 22 is put into an idling operation, and the engine 22 is stopped when the operation-continuation instruction flag F2 is a value 0, it may also be arranged such that when the power demand Pe* decreases crossing over the threshold value Pref, the engine 22 is stopped without being put into an idling operation when it is in a running state and the transmission 60 is in the state of Hi-gear or when it is in a running state and it is before the predetermined time t1 has elapsed since a Hi-Lo shifting being performed.

In the hybrid vehicle 20 of the embodiment, although it is arranged that when the learning-determination flag F1 is a value 0, the operation-continuation instruction flag F2 is set based on whether the transmission 60 is in the state of Lo gear or in the state of Hi gear and whether or not it is in a shift-predicted state, it may also be arranged such that either or both of whether the transmission 60 in the state of Lo gear or in the state of Hi gear and whether or not it is in a shift-predicted state are not determined.

In the hybrid vehicle 20 of the embodiment, although it is arranged that it is determined whether or not it is in a shift-predicted state based on the vehicle speed V, the vehicle-speed change amount $\Delta V$, the traveling route, etc in step S550 of the operation-continuation instruction flag setting processing of FIG. 10, it may also be arranged such that the determination is made based on one or two of the aforementioned values, or the determination is made based on, in addition to or in place of those, the air-intake amount of the inlet system of the engine 22, the torque demand Tr*, and the like.

In the hybrid vehicle 20 of the embodiment, although it is arranged that when the learning of the idling control value has not been completed, the Lo-Hi shift line Vhi and the Hi-Lo shift line Vlo are set at higher vehicle speeds compared with the case in which the learning has been completed, it may also be arranged such that only one of the Lo-Hi shift line Vhi and the Hi-Lo shift line Vlo is set at higher vehicle speeds, or the same Lo-Hi shift line Vhi and the Hi-Lo shift line Vlo are set regardless of whether or not the learning has been completed.

In the hybrid vehicle 20 of the embodiment, although it is arranged that the vehicle is equipped with a navigation apparatus 90, the arrangement without it is also possible.

In the hybrid vehicle 20 of the embodiment, although it is arranged that the transmission 60 which is shiftable with two shift ranges of Hi and Lo is used, the shift range of the transmission 60 is not limited to two ranges, but the shift range may be three or more ranges.

Figure 11:
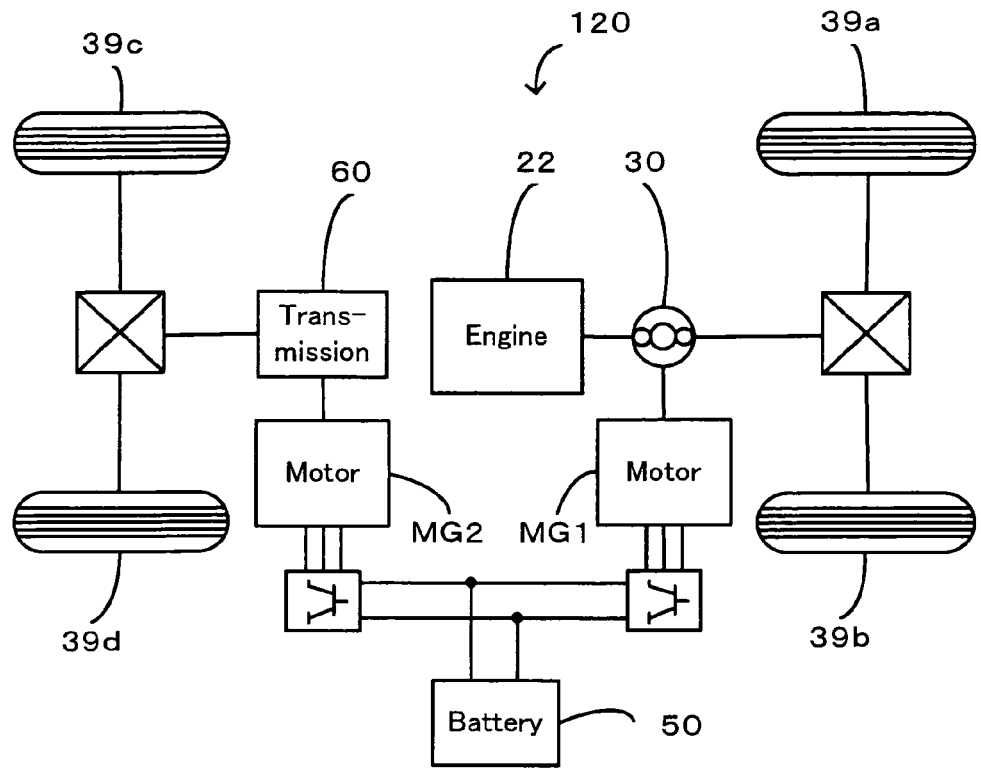
FIG. 11 is a block diagram to show the outline of the configuration of a hybrid vehicle 120 of an alternative embodiment.

In the hybrid vehicle 20 of the embodiment, although it is arranged that the power of the motor MG2 is shifted by a reduction gear 35 and output to the ring gear shaft 32a, it may also be arranged that as illustrated by a hybrid vehicle 120 of an alternative embodiment in FIG. 11, the power of the motor MG2 may be connected to an axle (which is connected to the drive wheels 39*c* and 39*d* in FIG. 11) different from the axle to which the ring gear shaft 32*a* is connected (the axle to which the drive wheels 39*a* and 39*b* are connected).

Figure 12:
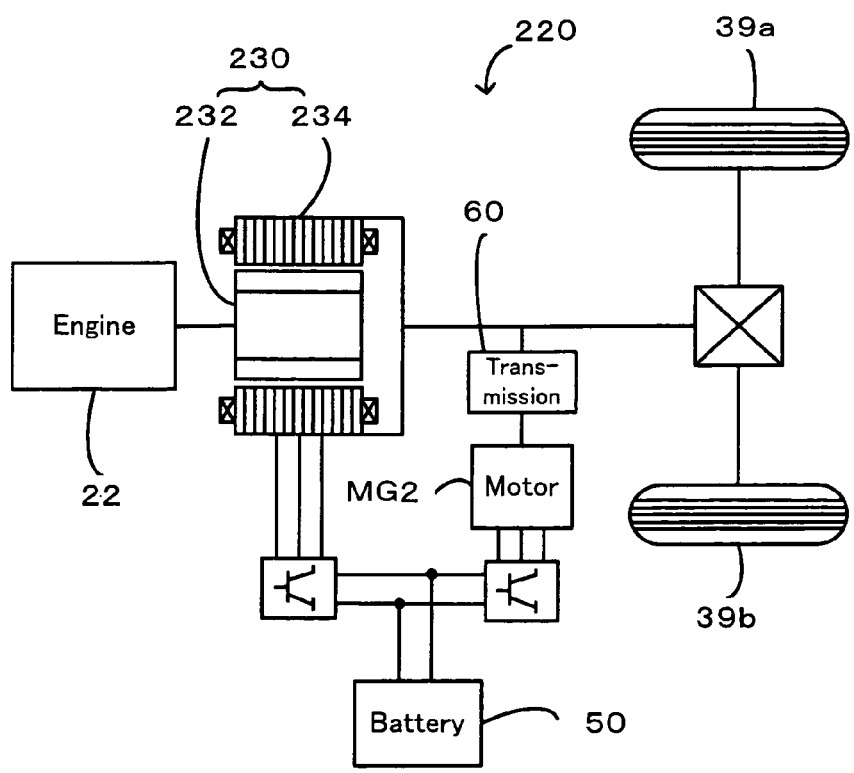
FIG. 12 is a block diagram to show the outline of the configuration of a hybrid vehicle 220 of an alternative embodiment.

In the hybrid vehicle 20 of the embodiment, although it is arranged that the power of the engine 22 is output to the ring gear shaft 32*a* as the drive shaft connected to the drive wheels 39*a* and 39*b* via the power distribution and integration mechanism 30, the vehicle may be equipped with, as illustrated in the hybrid vehicle 220 of an alternative embodiment in FIG. 12, a pair-rotor electric motor 230 which has an inner rotor 232 connected to the crankshaft 26 of the engine 22 and an outer rotor 234 connected to the drive shaft which outputs power to the drive wheels 39*a* and 39*b*, and which transmits part of the power of the engine 22 to the drive shaft and converts the residual power into electric power.

In the embodiment, although description has been made on the hybrid vehicle 20 including the engine 22, the power distribution and integration mechanism 30, the motors MG1 and MG2, and the transmission 60, the vehicle may be of any type which includes an internal combustion engine which can output power to the axle side and an electric motor which can output power to the axle side via a transmission.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The present invention is applicable in the vehicle production industry.

The invention claimed is:

1. A vehicle comprising:
an internal combustion engine which can output power to an axle side;
an electric motor which can input and output power;
a transmission unit connected to a rotating shaft of said electric motor and said axle side, said transmission unit transmitting power between said rotating shaft and said axle side accompanied by a change of shift range;
a driving-force demand setting module which sets a driving force demand required for said axle;
a learning-determination module which determines whether or not to learn an idling control value, which is a control value of idling operation of said internal combustion engine, based on a predetermined learning condition including a condition that said internal combustion engine is in an idling operation and a condition that the shift range of said transmission unit is a predetermined shift range;
a learning-execution module which executes the learning of said idling control value based on the determination result by said learning-determination module; and
a control unit which, when it is determined not to learn the idling control value by said learning-determination module, controls said internal combustion engine, said electric motor, and said transmission unit such that driving force based on said set driving force demand is output to said axle accompanied by an intermittent operation of said internal combustion engine and a change of shift range of said transmission unit, and when it is determined to learn the idling control value by said learning-determination module, controls said internal combustion engine, said electric motor, and said transmission unit such that driving force based on said set driving force demand is output to said axle accompanied by a continuation of the idling operation of said internal combustion engine within a range in which the idling operation of said internal combustion engine is permitted based on a running condition of the vehicle.

2. A vehicle according to claim 1, wherein said learning-determination module is a module which determines whether or not to learn said idling control value by supposing that said predetermined learning condition is not satisfied when a condition that a predetermined time has not elapsed since the shift range of said transmission unit being changed to said predetermined shift range is satisfied, even when the condition that said internal combustion engine is in an idling operation and the condition that the shift range of said transmission unit is the predetermined shift range are both satisfied.

3. A vehicle according to claim 2, wherein said learning-determination module is a module which determines whether or not to learn said idling control value based on the said predetermined learning condition regardless of whether or not the condition that said predetermined time has not elapsed since the shift range of said transmission unit being changed to said predetermined shift range is satisfied, when a condition that said vehicle is at a standstill is satisfied.

4. A vehicle according to claim 1, wherein said learning-determination module is a module which determines whether or not to learn said idling control value based on said predetermined learning condition regardless of whether or not the condition that the shift range of said transmission unit is the predetermined shift range is satisfied, when a condition that said vehicle is at a standstill is satisfied.

5. A vehicle according to claim 1,
said vehicle comprises an operation-continuation instruction module which determines whether or not it is in a shift-predicted state in which the shift range of the transmission unit is predicted to be changed to the predetermined shift range within a second predetermined time based on the running sate of said vehicle when the shift range of said transmission unit is not the predetermined shift range, and which instructs the continuation of the operation of said internal combustion engine when determining that it is in the shift-predicted state, and wherein
said control unit is a unit which performs control such that the operation of said internal combustion engine is continued when the continuation of the operation of an internal combustion engine is instructed by said operation-continuation instruction module.

6. A vehicle according to claim 5, said vehicle comprising:
a navigation apparatus which outputs a traveling route to a destination instructed by an operator, wherein
said operation-continuation instruction module is a module which determines whether or not it is in said shift-predicted state based on at least one of the vehicle speed, vehicle-speed change amount which is the change amount of the vehicle speed, and said output traveling route.

7. A vehicle according to claim 1,
said vehicle comprises a vehicle-speed detection module which detects a vehicle speed; wherein
said transmission unit is a unit which can change said predetermined shift range with a speedup-side shift range which is a shift range on the speedup side of said predetermined shift range with respect to the vehicle speed, said vehicle comprising a shift-instruction module which instructs an upshift of the shift range of said transmission unit such that the shift range of said transmission unit is changed from said predetermined shift range to said speedup-side shift range as the detected vehicle speed increases exceeding a first vehicle speed, as well as instructs a downshift of the shift range of said transmission unit such that the shift range of said transmission unit is changed from said speedup-side shift range to said predetermined shift range as the vehicle speed decreases exceeding a second vehicle speed which is not larger than said first vehicle speed, when the learning of the idling control value by said learning-execution module has been finished; and instructs an upshift of the shift range of said transmission unit as the vehicle speed increases exceeding a third vehicle speed which is larger than said first vehicle speed, as well as instructs a downshift of the shift range of said transmission unit as the vehicle speed decreases exceeding a fourth vehicle speed which is larger than said second vehicle speed and not larger than said third vehicle speed, when the learning of the idling control value by said learning-execution module has not been completed; and wherein said control unit is a unit which performs control such that the shift range of said transmission unit is changed based on the instruction by said shift-instruction module.

8. A vehicle according to claim 1, said vehicle comprises an electric power-mechanical power input output mechanism which is connected to an output shaft of said internal combustion engine and said axle side, and inputs and outputs power into and from said output shaft and said drive shaft accompanied by an input and output of electric power and mechanical power.

9. A vehicle according to claim 8, wherein said electric power-mechanical power input output mechanism is a mechanism which comprises: a three shaft-type power input output module which is connected to three shafts: the output shaft of said internal combustion engine, said axle, and said rotating shaft, and inputs or outputs power to any one of said three shafts based on the power input or output into or from the remaining two of said three shafts; and an electric motor which can input or output power into or from said rotating shaft.

10. A control method of a vehicle comprising an internal combustion engine which can output power to an axle side, an electric motor which can input and output power, and a transmission unit which is connected to a rotating shaft of said electric motor, and said axle side, and transmits power between said rotating shaft and said axle side accompanied by a change of a shift range, said control method of a vehicle comprises:

(a) determining whether or not to learn an idling control value which is a control value of the idling operation of said internal combustion engine based on a predetermined learning condition including a condition that said internal combustion engine is in an idling operation and a condition that the shift range of said transmission unit is a predetermined shift range; and (b) when it is determined not to learn said idling control value, controlling said internal combustion engine, said electric motor, and said transmission unit such that driving force based on a driving force demand required for said axle is output to said axle accompanied by an intermittent operation of said internal combustion engine and a change of shift range of said transmission unit; and when it is determined to learn said idling control value, controlling said internal combustion engine, said electric motor, and said transmission unit such that a driving force demand required for said axle is output to said axle accompanied by the continuation of the idling operation of said internal combustion engine within a range in which an idling operation of said internal combustion engine is permitted based on the running condition of the vehicle as well as executing the learning of said idling control value.

11. A control method of a vehicle according to claim 10, wherein said (a) is a step which determines whether or not to learn said idling control value by supposing that said predetermined learning condition is not satisfied when a condition that a predetermined time has not elapsed since the shift range of said transmission unit being changed to said predetermined shift range is satisfied, even when the condition that said internal combustion engine is in an idling operation and the condition that the shift range of said transmission unit is the predetermined shift range are both satisfied.

12. A control method of a vehicle according to claim 10, wherein said (a) is a step which determines whether or not to learn said idling control value based on said predetermined learning condition regardless of whether or not the condition that the shift range of said transmission unit is the predetermined shift range is satisfied, when a condition that said vehicle is at a standstill is satisfied.

13. A control method of a vehicle according to claim 10, said method comprising, before said step (b), a step (c) of instructing the continuation of the operation of said internal combustion engine when the shift range of said transmission unit is not the predetermined shift range, when it is determined whether or not to be in a shift-predicted state in which the shift range of said transmission unit is predicted to be changed to said predetermined shift range within a second predetermined time based on a running condition of said vehicle, wherein said step (b) is a step of controlling the operation of said internal combustion engine to be continued when the continuation of the operation of the internal combustion engine is instructed through said step (c).

14. A control method of a vehicle according to claim 10, wherein said transmission unit is a unit which can change between said predetermined shift range and a speedup-side shift range which is a shift range on the speedup side of said predetermined shift range with respect to the vehicle speed, said method comprises a step (d) of: instructing an upshift of the shift range of said transmission unit such that the shift range of said transmission unit is changed from said predetermined shift range to said speedup-side shift range as the vehicle speed increases exceeding a first vehicle speed, as well as instructing a downshift of the shift range of said transmission unit such that the shift range of said transmission unit is changed from said speedup-side shift range to said predetermined shift range as the vehicle speed decreases exceeding a second vehicle speed which is not larger than said first vehicle speed, when the learning of the idling control value by said step (b) has been completed; and instructing an upshift of the shift range of said transmission unit as the vehicle speed increases exceeding a third vehicle speed which is larger than said first vehicle speed, as well as instructing a downshift of the shift range of said transmission unit as the vehicle speed decreases exceeding a fourth vehicle speed which is larger than said second vehicle speed and not larger than said third vehicle speed, when the learning of the idling control value by said step (b) has not been completed; and said step (b) is a step of controlling the shift range of said transmission unit to be changed based on the instruction through said step (d).

* * * * *